United States Patent
Hafeez et al.

(10) Patent No.: US 12,369,194 B2
(45) Date of Patent: Jul. 22, 2025

(54) USE OF ALLOCATED WIRELESS CHANNELS IN A WIRELESS NETWORK

(71) Applicant: Charter Communications Operating, LLC, St. Louis, MO (US)

(72) Inventors: Abdulrauf Hafeez, Cary, NC (US); Amitav Mukherjee, Elk Grove, CA (US); Ahmad Reza Hedayat, Carlsbad, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/768,368

(22) Filed: Jul. 10, 2024

(65) Prior Publication Data
US 2024/0373464 A1 Nov. 7, 2024

Related U.S. Application Data

(62) Division of application No. 17/488,423, filed on Sep. 29, 2021, now Pat. No. 12,075,477.

(51) Int. Cl.
*H04W 74/0816* (2024.01)
*H04L 5/14* (2006.01)
*H04W 72/0446* (2023.01)
*H04W 74/08* (2024.01)

(52) U.S. Cl.
CPC ....... *H04W 74/0816* (2013.01); *H04L 5/1469* (2013.01); *H04W 72/0446* (2013.01); *H04W 74/0866* (2013.01)

(58) Field of Classification Search
CPC ......... H04W 74/0816; H04W 72/0446; H04W 74/0866; H04L 5/1469
See application file for complete search history.

(56) References Cited

U.S. PATENT DOCUMENTS

| | | | |
|---|---|---|---|
| 11,013,014 B2 | 5/2021 | Mukherjee | |
| 2014/0247764 A1 | 9/2014 | Kukosa | |
| 2018/0070369 A1 | 3/2018 | Papasakellariou et al. | |
| 2019/0044634 A1 | 2/2019 | Cui et al. | |
| 2020/0053713 A1* | 2/2020 | Bang | H04L 5/0053 |
| 2022/0095144 A1* | 3/2022 | Ren | H04W 72/20 |

(Continued)

FOREIGN PATENT DOCUMENTS

WO 2021022135 A1 2/2021

OTHER PUBLICATIONS

"American National Standard Methods of Measurement of the Electromagnetic and Operations Compatibility of Unlicensed Personal Communications Services (UPCS) Devices: ANSI C63. 17-2013", IEEE Stanard, IEEE, Piscataway, NJ, USA, Oct. 9, 2013 (Oct. 9, 2013), pp. 1-74, XP068055793.

(Continued)

*Primary Examiner* — Michael Thier
*Assistant Examiner* — Nevena Zecevic Sandhu
(74) *Attorney, Agent, or Firm* — Armis IP Law, LLC

(57) ABSTRACT

A wireless station is allocated use of a time slot in a given direction, uplink or downlink, on a given channel. The wireless station monitors for presence of wireless energy during a portion of the time slot. Based on a detected level of the wireless energy in the time slot, the wireless station controls transmission of wireless communications in a direction opposite to the configured direction in a remaining part of the time slot.

23 Claims, 17 Drawing Sheets

(56) References Cited

U.S. PATENT DOCUMENTS

| | | |
|---|---|---|
| 2022/0271909 A1 | 8/2022 | Abotabl et al. |
| 2022/0368489 A1 | 11/2022 | Grant et al. |
| 2023/0015475 A1 | 1/2023 | You et al. |
| 2023/0171803 A1 | 6/2023 | Wu et al. |

OTHER PUBLICATIONS

International Written Opinion and Search Report, PCT/US2022/044907, pp. 1-6.

* cited by examiner

| S.P. | PAL CHS | W.S. | S.A.I. 151 CCA (LBT) SUPPORT |
|---|---|---|---|
| 111 | WCH #1 | 131 | YES |
| 112 | WCH #2 | 132 | YES |
| 113 | WCH #3 | 133 | NO |
| 114 | WCH #4 | 134 | NO |

USE OF ALLOCATED WIRELESS CHANNELS IN A WIRELESS NETWORK

RELATED APPLICATION

This application is a divisional application of earlier filed U.S. patent application Ser. No. 17/488,423 entitled "USE OF ALLOCATED WIRELESS CHANNELS IN A WIRELESS NETWORK," filed on Sep. 29, 2021, the entire teachings of which are incorporated herein by this reference.

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference by wireless stations sharing use of the same spectrum.

There are multiple different types of wireless channels in a conventional CBRS band. For example, portions of spectrum in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user requires use of the channels, in theory, the licensed entity is able to freely use the PAL wireless channels in respective one or more predetermined geographical regions without interference by other lower priority entity users (such as lower priority GAA users).

Subsequent to allocation of one or more wireless channels, the wireless base stations use the allocated spectrum to provide one or more communication devices access to a remote network such as the Internet.

BRIEF DESCRIPTION OF EMBODIMENTS

There are deficiencies associated with conventional techniques of providing wireless services to mobile communication devices. For example, a wireless station may be allocated use of a wireless channel and timeslot exclusive of other wireless stations using the allocated wireless channel and timeslot. The timeslot may be allocated for downlink communications. However, the corresponding wireless station allocated the timeslot and corresponding wireless channel may wish to communicate in an uplink direction instead of the downlink direction. Failure to use the wireless channel in the timeslot results in wasted and inefficient use of wireless bandwidth.

Embodiments herein provide improved use of wireless spectrum, promoting more efficient use of wireless channels for wireless network service providers.

For example, a wireless system (wireless network environment) is shared amongst a hierarchal tier of users. A first wireless station is allocated a first wireless channel and corresponding time slot for communicating in a first direction in accordance with a time-division duplex configuration. The first wireless station monitors for presence of wireless energy during the time slot. Based on a detected level of the wireless energy, the first wireless station controls transmission of wireless communications in a second direction during the timeslot. In one embodiment, the second direction is opposite the first direction.

In accordance with a more specific example embodiment, the first wireless station receives notice or is preconfigured with settings information indicating a first wireless channel and a time slot allocated for use by the first wireless station to wirelessly receive data from a second wireless station. Assume, for sake of illustration, that the timeslot supports downlink of data to the first wireless station in accordance with a time-division duplex configuration. The first wireless station monitors for presence of wireless energy during the time slot instead of receiving wireless communications in a downlink from another wireless station. Based on a detected level of the wireless energy, the first wireless station controls transmission of wireless communications from the first wireless station. In one embodiment, controlling transmission of wireless communications from the first wireless station includes: wirelessly transmitting communications from the first wireless station to the second wireless station instead of receiving the data in the time slot from the second wireless station.

Thus, a timeslot may be allocated by an allocation management resource and/or a time-division duplex configuration for use by a first wireless station in a first direction. However, the allocated timeslot may be for conveyance of wireless communications in an opposite direction (e.g., second direction) in which the first wireless station would like to use the timeslot in the corresponding wireless channel. In such an instance, embodiments herein include, via the first wireless station or other suitable entity, monitoring for energy in a vicinity of the first wireless station or other suitable location during the timeslot and using such information as a basis in which to communicate from the first wireless station to the second wireless station. More specifically, in one embodiment, the first wireless station monitors for presence of the wireless energy in a second wireless channel that is adjacent to the first wireless channel. The second wireless channel may experience wireless interference if the first wireless station wirelessly communicates in the timeslot. To prevent wireless interference, the first wireless station monitors the adjacent one or more wireless channels (with respect to the first wireless channel) to determine wireless communications in the timeslot from the first wireless station would potentially cause interference with another wireless station.

If the first wireless station detects that the amount of energy in the second wireless channel for the timeslot (such as at a beginning portion of the timeslot) is below a threshold value, such as indicating that the first wireless station will not interfere with communications in the second wireless channel because no other wireless stations use the second wireless channel in the timeslot or detected wireless interference is low during the timeslot (in the adjacent wireless channel), the first wireless station uses the timeslot of the first wireless channel to transmit wireless communications from the first wireless station (such as user equipment or a mobile communication device) to a second wireless station (such as a wireless base station or other suitable entity).

Conversely, if the first wireless station detects that the amount of energy in the second wireless channel for the timeslot (such as at a beginning portion of the timeslot) is above a threshold value, such as indicating that the first wireless station would interfere with communications in the second wireless channel because one or more other wireless stations use the second wireless channel in the timeslot or channel interference is high during the timeslot, the first wireless station prevents transmitting wireless communications in the timeslot of the first wireless channel.

In further example embodiments, the first wireless channel allocated to the first wireless station is one of multiple wireless channels allocated from first bandwidth to operate a first communication system; the second wireless channel is one of multiple wireless adjacent channels allocated from second bandwidth to operate a second communication system. In other words, the first wireless channel is assigned for use by the first wireless station. A second wireless station may be assigned one or more adjacent wireless channels with respect to the first wireless channel.

As previously discussed, the first wireless station can be configured to monitor any portion of the respective allocated timeslot. In one embodiment, the first wireless station monitors the first wireless channel during a beginning portion of the time slot for presence of the wireless energy.

In still further example embodiments, a communication management resource associated with the first wireless station controls transmission of the wireless communications from the first wireless station based on a comparison of the detected level of the wireless energy (in the allocated first wireless channel) to a threshold level. In one embodiment, the wireless energy in the first wireless channel originates from wireless interference of a second wireless station communicating in a second wireless channel adjacent to the first wireless channel. If a magnitude of the wireless energy is below the threshold level, the first wireless station transmits wireless communications in the timeslot. Alternatively, if a magnitude of the wireless energy is above the threshold level, the wireless station prevents transmission of wireless communications in the timeslot.

In further example embodiments, the first wireless station prevents wireless transmission of a first communication from the first wireless station in the time slot in response to detecting use of a second wireless channel by a second wireless station during the time slot, the second wireless channel adjacent to the first wireless channel.

Still further example embodiments herein include, via a communication management resource associated with the first wireless station, monitoring for the presence of wireless energy in response to detecting that the first wireless station has been allocated a time slot to wirelessly receive data from a second wireless station. The communication management resource of the first wireless station transmits the wireless communications from the first wireless station to the second wireless station in response to detecting that the wireless energy in the adjacent wireless channel is below a threshold level.

Further embodiments herein, at the first wireless station, receiving control information from a wireless base station; the second wireless base station dynamically notifies the first wireless station to monitor for presence of the wireless energy during the allocated time slot.

In still further example embodiments, the time slot of the first wireless channel is allocated for use by multiple wireless stations including the first wireless station to communicate in the second direction (such as an uplink or downlink direction) to a second wireless station even though a corresponding time-division duplex configuration indicates that the timeslot is allocated for communications in the first direction. The one or more wireless stations compete for use of the first wireless channel. In any suitable manner, each of the one or more wireless stations monitor the one or more adjacent wireless channels with respect to the first wireless channel to determine whether or not they can use the allocated timeslot of the first wireless channel.

In still further example embodiments, the first wireless station receives notification from a wireless base station or other suitable entity to monitor a second wireless channel for the presence of the wireless energy. The second wireless channel is allocated for use by a second wireless station in the network environment during the time slot. If the first wireless station detects that the second wireless station uses the second wireless channel in the timeslot, the first wireless station prevents transmission of communications from the first wireless station over the first wireless channel.

In yet further example embodiments, a second wireless station (such as a wireless base station) also monitors for presence of the wireless energy in the allocated time slot of the first wireless channel. The first wireless station, after the monitoring for presence of the wireless energy, receives feedback from the second wireless station indicating that the second wireless station detected the presence of wireless energy above a threshold level. Based on the feedback, the first wireless station then prevents the transmission of the wireless communications from the first wireless station in response to receiving the feedback.

In further example embodiments, a second wireless station (such as a wireless base station) also monitors for presence of the wireless energy in the allocated time slot of the first wireless channel. The first wireless station, after monitoring for presence of the wireless energy, also receives feedback from the second wireless station indicating that the second wireless station detected the presence of wireless energy in the second wireless channel as being below a threshold level. In such an instance, because there is no chance or at least low chance of wireless interference by the first wireless station communicating in the allocated timeslot and wireless channel, the first wireless station initiates the transmission of the wireless communications from the first wireless station in response to: i) receiving the feedback, and ii) detecting that a magnitude of the wireless energy as detected by the first wireless station is less than a threshold value.

Thus, embodiments herein provide novel ways of providing more efficient use of wireless bandwidth.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware)

having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

Another embodiment includes a computer readable storage medium and/or system having instructions stored thereon to facilitate wireless communications in a network environment. The instructions, when executed by computer processor hardware, cause the computer processor hardware (such as one or more co-located or disparately processor devices) associated with a first wireless station to: monitor for presence of wireless energy during a time slot allocated to the first wireless station for communicating in a first direction over a first wireless channel in accordance with a time-division duplex configuration; and based on a detected level of the wireless energy, control transmission of wireless communications in a second direction during the timeslot, the second direction being opposite the first direction.

Another embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive notice of a first wireless channel and a time slot allocated for use by a first wireless station in a network environment, the timeslot supporting downlink of data to the first wireless station in accordance with a time-division duplex configuration; monitor for presence of wireless energy during the time slot; and control transmission of wireless communications from the first wireless station based on a detected level of the wireless energy.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating allocation of available wireless channels during non-detection of an incumbent entity according to embodiments herein.

Figure 1:
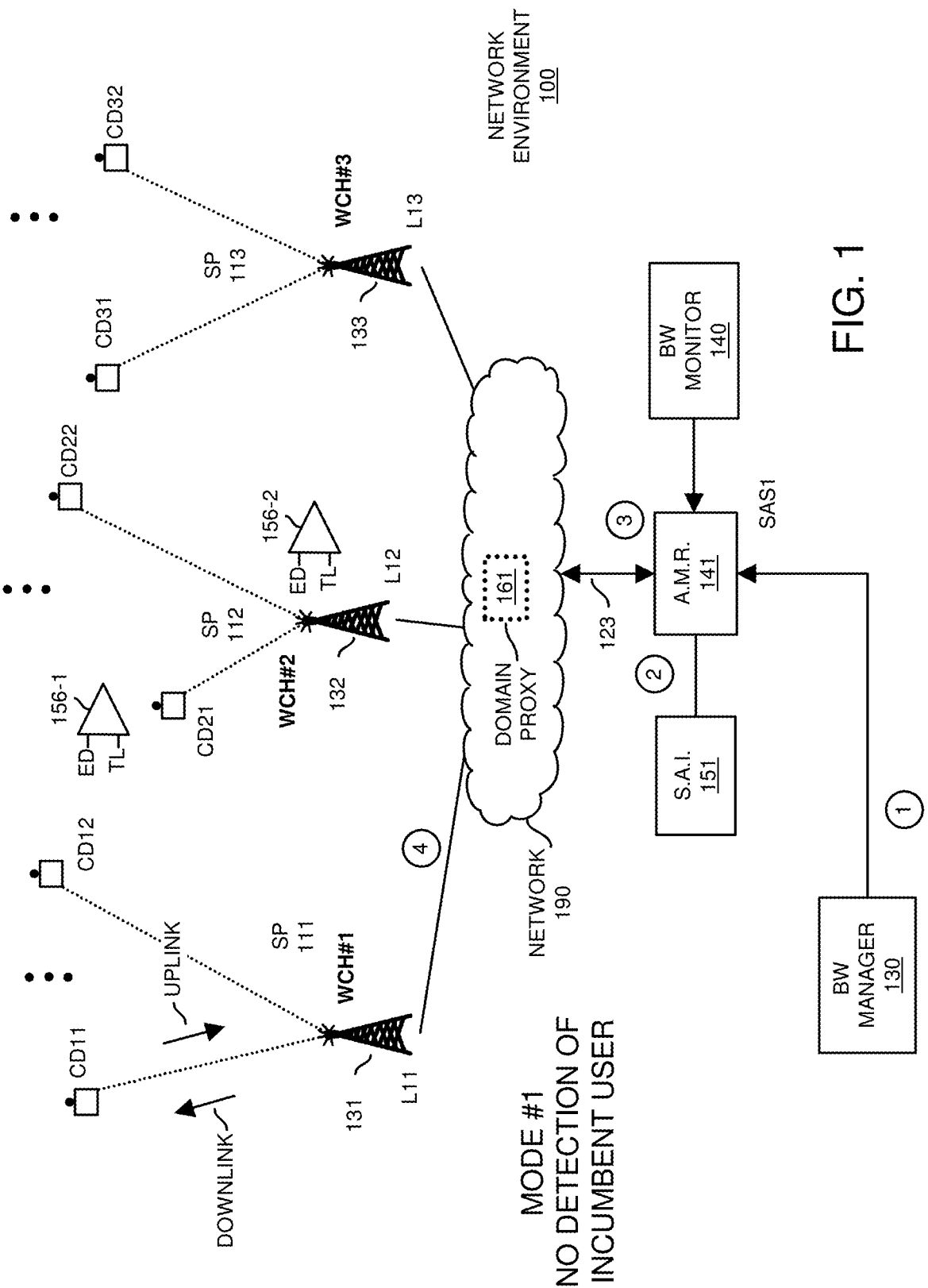
FIG. 1 is an example diagram illustrating a wireless network environment implementing hierarchical wireless spectrum allocation and novel use of certain wireless channels according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless station is allocated use of a time slot in a given direction, such as uplink or downlink, on a given channel. The wireless station monitors for presence of wireless energy during a portion of the time slot. Based on a detected level of the wireless energy in the time slot, the wireless station controls transmission of wireless communications in a direction opposite to the configured (given) direction in a remaining part of the time slot.

Thus, in accordance with a more specific example embodiment, a first wireless station is allocated a first wireless channel and a time slot for communicating in a first direction in accordance with a time-division duplex configuration. The first wireless station monitors for presence of wireless energy during the time slot. Based on a detected level of the wireless energy, the first wireless station controls transmission of wireless communications in a second direction during the timeslot.

Now, more specifically, FIG. 1 is an example diagram illustrating a hierarchical wireless network implementing allocation and use of wireless bandwidth according to embodiments herein.

As shown in this example embodiment, network environment 100 includes bandwidth manager 130, bandwidth monitor 140, allocation management resource 141 (communication management resource such as spectrum access system SAS1), network 190 (such as including one or more of the Internet, wireless infrastructure, cellular system, wireless access network, etc.), and wireless stations such as wireless base station 131, wireless base station 132, wireless base station 133, . . . , wireless station CD11 (a.k.a., end user device, user equipment mobile communication device, communication device, etc.), wireless station CD12, wireless station CD21, wireless station CD22, wireless station CD31, wireless station CD32, etc.

In one embodiment, the network 190 includes one or more domain proxies 161 that facilitate communications between the allocation management resources and the wireless base stations. For example, depending on the embodiment, allocation management resource 141 and wireless stations 131, 132, etc., can communicate directly with each other over network 190 or through domain proxy 161.

Note that each of the resources (such as wireless stations, communication devices, allocation management resources, spectrum monitor, spectrum manager, etc.) in network environment 100 can be configured to include appropriate hardware, software, or combination of hardware and software to carry out respective operations as discussed herein.

More specifically, bandwidth manager 130 can be configured as bandwidth manager hardware, bandwidth manager software, or a combination of bandwidth manager hardware and bandwidth manager software; bandwidth monitor 140 can be configured as bandwidth monitor hardware, bandwidth monitor software, or a combination of bandwidth monitor hardware and bandwidth monitor software; allocation management resource 141 can be configured as allocation management hardware, allocation management software, or a combination of allocation management hardware and allocation management software; wireless station 131 can be configured as wireless station hardware, wireless station software, or a combination of wireless station hardware and wireless station software; wireless station 132 can be configured as wireless station hardware, wireless station software, or a combination of wireless station hardware and wireless station software; wireless station 133 can be configured as wireless station hardware, wireless station software, or a combination of wireless station hardware and wireless station software; wireless station CD11 can be configured as wireless station hardware, wireless station software, or a combination of wireless station hardware and wireless station software; wireless station CD12 can be configured as wireless station hardware, wireless station software, or a combination of wireless station hardware and wireless station software; wireless station CD21 can be configured as wireless station hardware, wireless station software, or a combination of wireless station hardware and wireless station software; wireless station CD22 can be configured as wireless station hardware, wireless station software, or a combination of wireless station hardware and wireless station software; wireless station CD31 can be configured as wireless station hardware, wireless station software, or a combination of wireless station hardware and wireless station software; wireless station CD32 can be configured as wireless station hardware, wireless station software, or a combination of wireless station hardware and wireless station software; and so on.

Note that the resources as discussed herein can be implemented in any suitable manner and at any suitable location.

Each communication device (such as CD11, CD12, CD21, CD22, CD31, CD32, etc.) is mobile or stationary with respect to a corresponding wireless base station (such as wireless station 131, wireless station 132, wireless station 133, etc.) providing it access to network 190. In one embodiment, as previously mentioned, network 190 includes the Internet or other networks.

As further shown, wireless station 131 (such as a wireless base station operated by a first wireless network service provider 111/operator) is disposed at location L11 providing communication devices CD11, CD12, etc., access to network 190.

Wireless station 132 (such as a wireless base station operated by a second wireless network service provider 112/operator) is disposed at location L12 providing communication devices CD21, CD22, etc., access to network 190.

Wireless station 133 (such as a wireless base station operated by a third wireless network service provider 113/operator) is disposed at location L13 providing communication devices CD31, CD32, etc., access to network 190; and so on. Network environment 100 includes any suitable number of wireless stations.

In further example embodiments, the network environment 100 implements a spectrum access system to allocate use of one or more CBRS (Citizens Band Radio Service) wireless channels for use buffer the wireless stations (i.e., wireless station 131, wireless station CD11, wireless station CD12, wireless station 132, wireless station CD21, wireless station CD22, wireless station 133, wireless station CD31, wireless station CD32, etc.). In such an embodiment, note that an incumbent user (first-priority tier 1 user) has highest priority rights to use all wireless channels.

For example, in one embodiment, as previously discussed, the network environment 100 includes allocation management resource 141. The allocation management resource 141 allocates one or more wireless channels from a tiered hierarchy in which the incumbent user has highest priority rights.

Additionally, or alternatively, note that the network environment 100 can be implemented to support shared use of any wireless bandwidth such as bandwidth other than from a CBRS band.

Note further that the implementation of allocation management resource is optional. The wireless stations and corresponding service providers can establish agreements as to use of wireless channels in network environment 100.

Further in this example embodiment, as its name suggests, the bandwidth monitor 140 (such as an ESC or Environmental Sensing Capability) in network environment monitors use of the wireless channels 1-15 (or other channels) by a respective one or more incumbent entity.

If the bandwidth monitor 140 detects use of any of the one or more wireless channels by a higher priority user, the bandwidth monitor 140 notifies the allocation management resource 141 of this condition. In response to detecting the condition of the incumbent user using a respective one or more wireless channel, the allocation management resource 141, in turn, notifies (such as immediately or within a short timeframe such as a few minutes) appropriate wireless stations (and corresponding wireless network service providers) to discontinue use of any previously allocated wireless channels used by the incumbent entity.

In one embodiment, each of the one or more allocation management resources in the network environment 100 individually or collectively keeps track of a respective location of each of the wireless stations and allocates wireless channels such that two or more wireless stations implementing wireless communications do not interfere with each other. For example, in one embodiment, in furtherance of providing protected use of allocated bandwidth, the allocation management resources allocate different wireless channels to wireless stations that are in the same location or geographical region. The allocation management resource 141 or other suitable entity can be configured to prevent or reduce wireless interference by allocating use of wireless channels in the different locations such that use of wireless channels by one set of wireless stations does not interference with other wireless stations.

During further operation, note that the bandwidth manager 130 initially produces spectrum allocation information 151 or other suitable information indicating assignment of bandwidth (one or more PAL wireless channels) such as determined from results of a bandwidth auction in which operators pay license fees for use of one or more of wireless channels 1-10. Certain or any of the wireless channels may be allocated to GAA users if not used by PAL users or an incumbent entity. An example of such allocation and use of wireless channels is shown in FIG. 2.

FIG. 2 is an example diagram illustrating assignment, allocation, and use of available wireless channels during non-detection of an incumbent entity according to embodiments herein.

As previously discussed, the wireless stations in network environment 100 can be operated by any number of multiple different service providers.

For example, in one embodiment, as indicated by the spectrum allocation information 151 managed by the allocation management resource 141 or other suitable entity, the first wireless station 131 (at or around location L11) and potentially one or more other wireless stations in the vicinity of location L11 are operated by a first wireless network service provider 111; the first wireless network service provider 111 may be a PAL user having a license to use wireless channel #1 (a.k.a., WCH #1) or may be a GAA user granted use of the wireless channel #1 to support connectivity with the corresponding communication devices CD11, CD12, . . . .

As further indicated by the spectrum allocation information 151 managed by the allocation management resource 141 or other suitable entity, the second wireless station 132 (at or around location L12) and potentially one or more other wireless stations are operated by a second wireless network service provider 112; the second wireless network service provider 112 may be a PAL user having a license to use wireless channel #2 (a.k.a., WCH #2) or may be a GAA user granted use of the wireless channel #2 to support connectivity with the corresponding communication devices CD21, CD22, . . . .

As further indicated by the spectrum allocation information 151 managed by the allocation management resource 141 or other suitable entity, the wireless station 133 (at or around location L13) and potentially one or more other wireless stations are operated by a third wireless network service provider 113; the third wireless network service provider 113 may be a PAL user having a license to use wireless channel #3 (a.k.a., WCH #3) or may be a GAA user granted use of the wireless channel #3 to support connectivity with the corresponding communication devices CD31, CD32, . . . .

In one embodiment, the spectrum allocation information 151 indicates whether the corresponding service provider and corresponding equipment support dynamic TDD configurations as discussed herein. In this example embodiment, the service provider 111 and corresponding equipment (such as wireless station 131, wireless station CD11, wireless station CD12, etc.) support channel sensing and flexible use of uplink/downlink timeslots. The service provider 112 and corresponding equipment (such as wireless station 132, wireless station CD21, wireless station CD22, etc.) support channel sensing and flexible use of uplink/downlink timeslots.

Referring again to FIG. 1, in processing operation #1, the bandwidth manager 130 distributes the spectrum allocation information 151 to the spectrum allocation management resource 141 (such as SAS1).

In processing operation #2, the allocation management resource 141 stores and updates the spectrum allocation information 151.

Further in this example embodiment, in processing operation #3, the wireless stations 131, 132, and 133 register with the allocation management resource 141 for use of wireless channels. Via communications 123 over network 190 to wireless stations 131, 132, 133, etc., the allocation management resource 141 allocates use of the wireless bandwidth (wireless channels) in accordance with the spectrum allocation information 151.

For example, the wireless base station 131 initially registers the wireless station 131 and corresponding one or more communication devices CD11, CD12, etc., with the allocation management resource 141 for use of wireless channels. As previously discussed, in accordance with the spectrum allocation information 151, because no incumbent entity is present in the network environment 100, the allocation management resource 141 allocates use of wireless channel #1 to the wireless base station 131 and corresponding communication devices at or around location L11.

As previously discussed, note again that the network 190 can be configured to include one or more domain proxy 161 through which the wireless base station 131 communicates with the allocation management resource 141. In a reverse direction, the allocation management resource 141 communicates through the domain proxy 161 to the wireless base station 131. Alternatively, note that the wireless base station 131 and the allocation management resource 141 transmit communications directly to each other without use of the domain proxy 161 as an intermediary resource.

Additionally, the wireless base station 132 operated by the second wireless network service provider 112 registers with the allocation management resource 141 for use of wireless channels. Because no incumbent entity is present, the allocation management resource 141 allocates use of wireless channel #2 to the wireless base station 132 and corresponding service provider 112. In one embodiment, the wireless station 132 or other suitable entity notifies the allocation management resource 141 that it (and corresponding mobile communication device (CD21, CD22, etc.) supports channel sensing and monitoring (such as listen before talk, clear channel assessment, etc.) on any of one or more wireless channels.

Thus, in one embodiment, the wireless station 132 registers with a spectrum access system (SAS) indicating its channel sensing and TDD configuration capability. Additionally, or alternatively, the bandwidth manager 130 produces the spectrum allocation information 151 to indicate that the wireless station 132 and corresponding communication devices support channel sensing and flexible use of a TDD configuration as discussed herein.

Further in this example embodiment, note that an incumbent user/entity (such as a naval vessel or other suitable entity implementing RADAR use of one or more wireless channels) is a first-priority tier 1 user in the priority hierarchy, the PAL users are second-priority tier 2 users in the priority hierarchy, and the GAA users are third-priority tier 3 users in the priority hierarchy. In the hierarchy, the incumbent users have highest priority access rights; the PAL users have second highest priority access rights; the GAA users have the lowest priority access rights.

As further shown, each of the wireless stations can be configured to include appropriate circuitry to generate: i) an energy detect value, ED, indicative of a magnitude of detected wireless energy, ii) a threshold level value, TL, and iii) a comparator 156 to perform comparisons.

Figure 3:
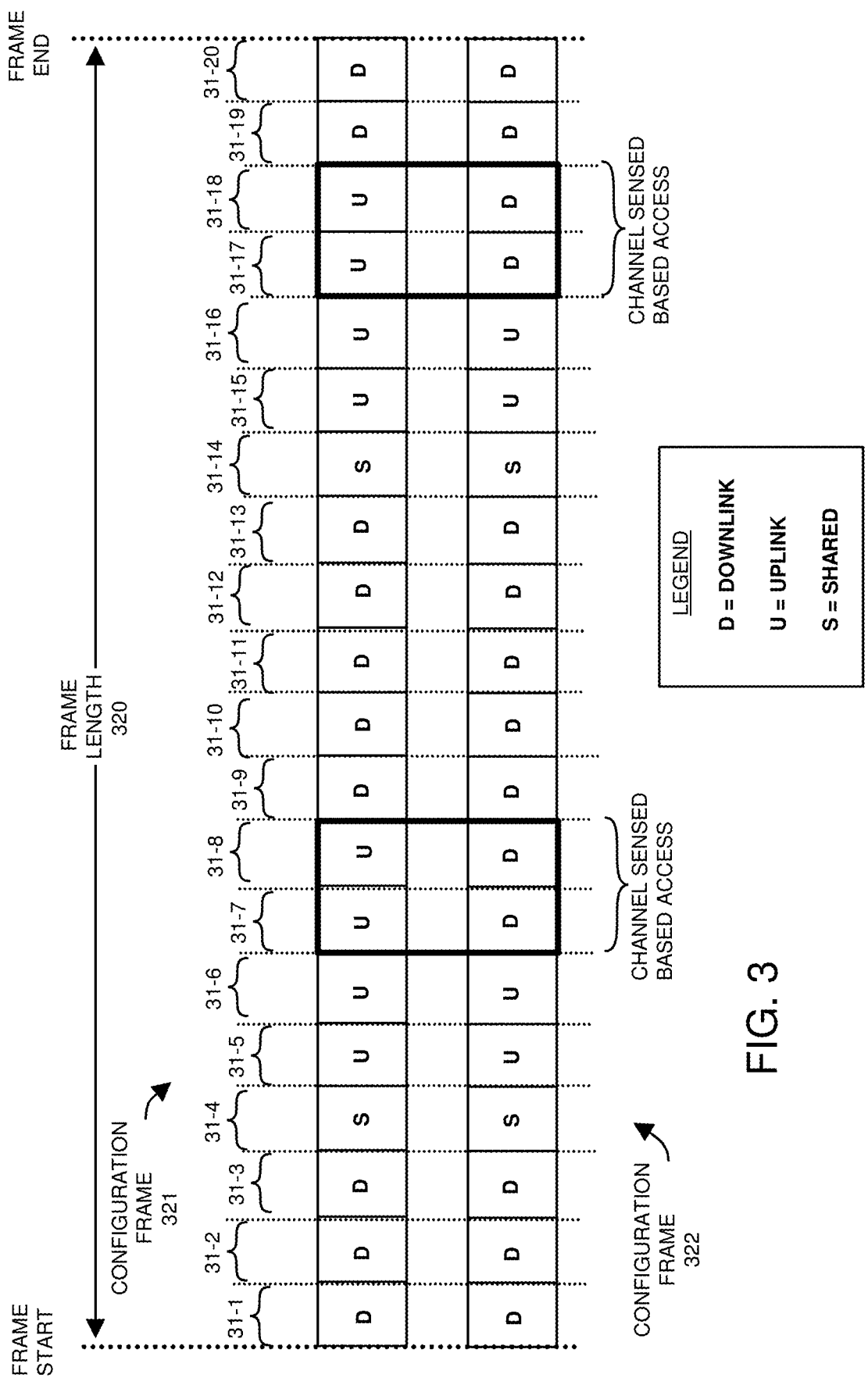
FIG. 3 is an example diagram illustrating multiple different time-division duplex frame configurations according to embodiments herein.

FIG. 3 is an example diagram illustrating multiple different frame configurations according to embodiments herein.

In one embodiment, the allocation management resource 141 or other suitable entity notifies the respective wireless stations in wireless network environment 100 which of multiple possible time-division duplex configuration frames (such as configuration frame 321 or configuration frame 322) of frame length 320 to implement with respect to use of allocated wireless channels. Implementation of the selected configuration frame amongst multiple wireless stations prevents wireless interference.

As shown, the configuration frame 321 includes multiple timeslots allocated to support downlink (communications from a wireless base station to the corresponding downstream communication devices) or uplink communications (communications from the communication devices to the wireless base station).

For example, for configuration frame 321: time slot 31-1 is allocated to support downlink communications; time slot 31-2 is allocated to support downlink communications; time slot 31-3 is allocated to support downlink communications; time slot 31-4 is a special time slot allocated to support uplink or downlink communications; time slot 31-5 is allocated to support uplink communications; time slot 31-6 is allocated to support uplink communications; time slot 31-7 is allocated to support uplink communications; time slot 31-8 is allocated to support uplink communications; time slot 31-9 is allocated to support downlink communications; time slot 31-10 is allocated to support downlink communications; time slot 31-11 is allocated to support downlink communications; time slot 31-12 is allocated to support downlink communications; time slot 31-13 is allocated to support downlink communications; time slot 31-14 is a special time slot allocated to support uplink or downlink communications; time slot 31-15 is allocated to support uplink communications; time slot 31-16 is allocated to support uplink communications; time slot 31-17 is allocated to support uplink communications; time slot 31-18 is allocated to support uplink communications; time slot 31-19 is allocated to support downlink communications; time slot 31-20 is allocated to support downlink communications.

For configuration frame 322: time slot 31-1 is allocated to support downlink communications; time slot 31-2 is allocated to support downlink communications; time slot 31-3 is allocated to support downlink communications; time slot 31-4 is a special time slot allocated to support uplink or downlink communications; time slot 31-5 is allocated to support uplink communications; time slot 31-6 is allocated to support downlink communications; time slot 31-7 is allocated to support downlink communications; time slot 31-8 is allocated to support downlink communications; time slot 31-9 is allocated to support downlink communications; time slot 31-10 is allocated to support downlink communications; time slot 31-11 is allocated to support downlink communications; time slot 31-12 is allocated to support downlink communications; time slot 31-13 is allocated to support downlink communications; time slot 31-14 is a special time slot allocated to support uplink or downlink communications; time slot 31-15 is allocated to support uplink communications; time slot 31-16 is allocated to support uplink communications; time slot 31-17 is allocated to support downlink communications; time slot 31-18 is allocated to support downlink communications; time slot 31-19 is allocated to support downlink communications; time slot 31-20 is allocated to support downlink communications.

In a conventional communication environment, each of the wireless stations implements a same selected time-division duplex configuration. This prevents one wireless station from causing wireless interference to another wireless station because it is known in what direction the wireless stations will be transmitting.

In contrast to conventional techniques, according to embodiments herein, the service providers can use a respective time-division duplex configuration in a different manner as long as the service providers and corresponding equipment implements safeguards to prevent wireless interference amongst other wireless stations if the service providers implement communications in an opposite direction than as specified by an implemented time-division duplex configuration for the that wireless station.

In Frequency Division Duplexing (FDD) a paired frequency band is used for communicating in both downlink (DL) and uplink (UL) directions by sharing wireless channels in the frequency domain.

In Time Division Duplexing (TDD) a single unpaired frequency band is used to communicate in downlink and uplink directions by sharing in the time domain, i.e. subframes or slots.

Both LTE (Long Term Evolution) and NR (New Radio) have several TDD UL-DL (Uplink-Downlink) frame configurations allowing flexible use of uplink and downlink slots. NR also allows the UL-DL frame configuration of a network to be changed dynamically.

In certain instances, network operators may wish to flexibly or dynamically use the different TDD UL-DL frame configurations (such as indicated by configuration frame 321, etc.) to support their use cases. This, however, may not possible in the same band or adjacent bands within close proximity of each other without causing or suffering from harmful interference. For example, a base station of one network transmitting DL (Downlink) in an assigned wireless channel may interfere with a BS (Base station) of a second network receiving wireless communications over an uplink in a second wireless channel (adjacent the first wireless channel) from a mobile communication device. In other words, simply communicating in your assigned wireless channel (in an opposite manner of a respective uplink or downlink designation) may cause interference to adjacent wireless channels.

To avoid this cross-channel interference, network operators often have to coordinate the use of their TDD configurations in proximity of each other. This results in a waste of UL-DL resources for operators who desire different TDD configurations.

Embodiments herein allow an operator's BSs or UEs to transmit in their desired DL/UL direction after sensing for adjacent channel or adjacent band users and finding them to be inactive in a given slot or subframe. As further discussed herein, this results in improved utilization of UL-DL resources (such as timeslots in wireless channels), while avoiding mutual interference.

According to one configuration, as previously discussed, a wireless network is shared amongst a hierarchal tier of users. The wireless network environment includes communication management hardware. The communication management hardware such as associated with the wireless station CD21 receives notice of a first wireless channel and a time slot allocated for use by a first wireless station in a network environment. The first wireless station and corresponding communication management hardware monitor for presence of wireless energy in a second wireless channel (such as adjacent channel susceptible to co-channel interference) during the time slot. Based on a detected level of the wireless energy in the time slot, the first wireless station controls transmission of wireless communications from the first wireless station.

Thus, embodiments herein include a hybrid TDD access for a user to coexist with intra-band users in a shared TDD band governed by a coexistence manager (CxM) or spectrum access system (SAS).

In this embodiment, a communication management resource in the network environment 100 (such as CxM/ SAS) allows a TDD Configuration(s) in a given geographical area, e.g. based on market interest. However, an operator may desire a different TDD Configuration, e.g. based on its use case, that is not permitted by SAS/CxM in the area (current implementation).

In this embodiment, CxM allows the operator's equipment to access its channels using hybrid TDD access: i) Conventional TDD access in slots/subframes/special subframe symbols with the same direction as permitted by CxM, i.e. UL with UL, or DL with downlink, ii) Channel sensing based access in slots/subframes/special subframe symbols with the opposite direction as permitted by CxM, i.e. DL with UL, or UL with DL.

In one embodiment, channel sensing based access is used to avoid interference to adjacent channel users. This can be achieved by sensing channels adjacent to the operating channel(s) in slots/subframes/special subframe symbols where the equipment wants to use the opposite direction for transmission: i) If the slot/subframe/special subframe symbol is found to be occupied in adjacent channels, the device stays idle until the next slot/subframe/special subframe symbol. If the slot/subframe/special subframe symbol is found to be idle, the device uses the remaining period in the slot/subframe/special subframe symbol for transmission in the opposite direction; ii) If non-slot based transmissions (<14 symbols) are used by adjacent channel users, then multiple CCAs may be attempted in a slot/subframe and once successful, non-slot-based transmission is used for the remaining period.

Clear Channel Assessment (CCA) (such as listen before talk) by Energy detection (ED) may be used to detect channel occupancy in adjacent channels.

Figure 4:
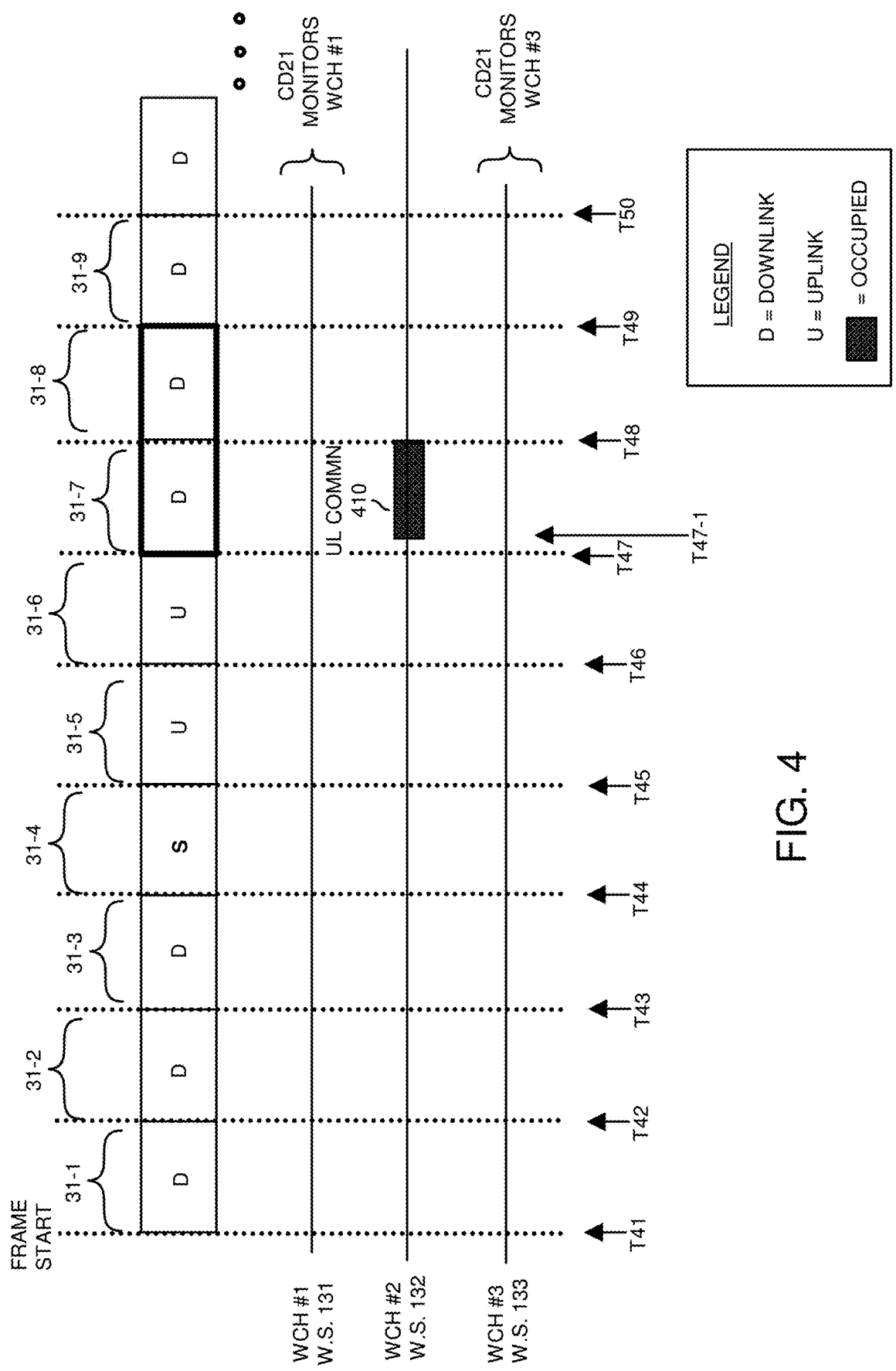
FIG. 4 is an example diagram illustrating monitoring of adjacent wireless channels and dynamic use of an assigned wireless channel according to embodiments herein.

FIG. 4 is an example diagram illustrating monitoring of adjacent wireless channels and dynamic use of an assigned wireless channel according to embodiments herein.

In further example embodiments, it may be sufficient to implement CCA (Clear Channel Assessment) or listen before talk techniques in immediately adjacent channels in order to communicate in an opposite direction than as allocated by a communication management resource. Note that use of the terms downlink and uplink are used for the sake of explaining the different directions of communicating data. For example, the term downlink represents a first direction; the term uplink represents a second direction.

For example, as shown in FIG. 4, assume that the wireless station 132 allocates communication device CD21 use of the wireless channel #2 and corresponding timeslot 31-7. The timeslot 31-7 is a downlink timeslot according to the respective time-division duplex configuration frame, meaning that the wireless station 132 is able to communicate in the downlink direction to the communication device CD21 without interfering with other wireless stations. However, the wireless station 132 may desire to use the timeslot to communicate in an uplink direction from the communication device CD21 to the wireless station 132.

As previously discussed with respect to FIG. 1, communications wirelessly transmitted from the communication device CD21 in an uplink to the wireless base station 132 may result in cross interference with respect to other wireless stations using the same timeslot 31-7 in an assigned downlink direction.

Referring again to FIG. 4, in order for the wireless station CD21 to communicate in the uplink direction instead of the downlink direction, the wireless station CD21 needs to make sure that it will not interfere with other wireless stations in the network environment 100.

For example, to prevent occurrence of interference, the wireless station CD21 allocated use of the timeslot 31-7 monitors the timeslot 31-7 for communications in adjacent wireless channels #1 and #3. Because the timeslot 31-7 in channel #2 has been assigned for use by the wireless station CD21, it is known that no other nearby wireless stations will communicate in timeslot 31-7 so there is no need for the wireless station CD21 to monitor wireless channel #2 via listen before talk. However, communications in the opposite direction of the allocated downlink (such as in the uplink from the wireless station CD21 to the wireless station 132) for timeslot 31-7 may result in cross link interference to the other wireless stations assigned and using wireless channels #1 and 3 in timeslot 31-7.

Thus, the wireless station CD21 receives notice of a wireless channel #2 and a time slot 31-7 allocated for use by the wireless station CD21. In further example embodiments, the wireless station CD21 also receives notification (such as permission) from the wireless station 132 (or other suitable entity) to monitor wireless channel #1 and/or wireless channel #3 such as channels adjacent to the wireless channel #2.

At or around time T47, the wireless station CD21 monitors for presence of wireless energy in wireless channels #1 and #3 during the time slot 31-7. Based on a detected level of the wireless energy during such time, the wireless station CD21 controls transmission of wireless communications from the wireless station CD21 to the wireless station 132. In one embodiment, the wireless station CD21 wirelessly transmits communications 410 in an uplink direction (opposing the default downlink designation assigned to the timeslot 31-7) from the wireless station CD21 to the wireless station 132 instead of the wireless station CD21 receiving data in a downlink direction from the wireless station 132 and the timeslot 31-7.

Thus, a timeslot 31-7 may be allocated by a communication management resource associated with the wireless station 132 for use by a wireless station CD21. However, the allocated timeslot 31-7 may be for conveyance of wireless communications in an opposite direction in which the wireless station CD21 would like to use the corresponding wireless channel #2. In such an instance, embodiments herein include, via the wireless station CD21 or other suitable entity, monitoring for energy in a vicinity of the wireless station CD21 or other suitable location during the timeslot 31-7 and using such information as a basis in which to claim communications from the wireless station CD21 to the wireless station 132. More specifically, in one embodiment, the wireless station CD21 monitors for presence of the wireless energy in the wireless channel #1 and/or wireless channel #3 that are adjacent to the wireless channel #2. The wireless channels #1 and #3 may experience wireless interference if the wireless station CD21 wirelessly communicates in the timeslot 31-7 in the uplink direction. To prevent wireless interference, in a manner as previously discussed, the wireless station CD21 monitors the adjacent one or more wireless channels (with respect to the wireless channel #2) to determine if transmission of wireless communications in the timeslot 31-7 from the first wireless station would potentially cause interference with another wireless station.

In this case shown in FIG. 4, the wireless station CD21 detects that the amount of energy in the wireless channel #1 and #3 for the timeslot 31-7 (such as at a beginning portion of the timeslot 31-7) is below a threshold value, such as indicating that the wireless station CD21 will not interfere with communications in the wireless channels #1 and #3 because no other wireless stations appear to be using the second wireless channel in the timeslot 31-7 or co-channel interference is low during the timeslot 31-7, the wireless station CD21 uses the timeslot 31-7 of the wireless channel #2 to transmit wireless communications 410 from the wireless station CD21 (such as user equipment or a mobile communication device) to the wireless station 132 (such as a wireless base station).

Figure 8:
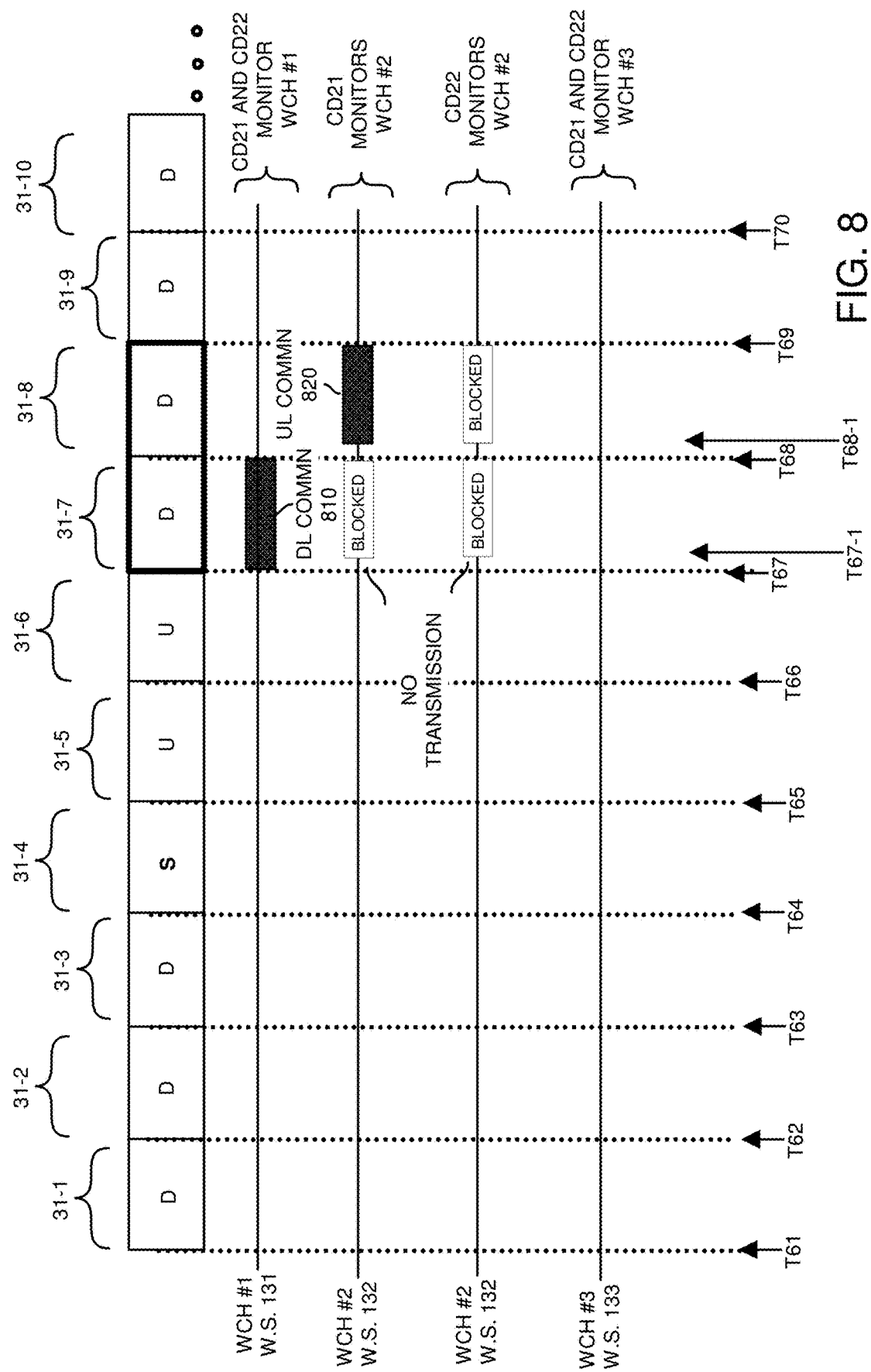
FIG. 8 is an example diagram illustrating multiple wireless stations sharing use of an assigned wireless channel and monitoring of one or more adjacent wireless channels according to embodiments herein.

Thus, according to embodiments herein, Clear Channel Assessment (CCA) by Energy detection (ED) may be used to detect channel occupancy in adjacent channels (via adjacent channel sensing). In further example embodiments, note that random backoff times may be implemented to avoid collision among multiple users employing channel sensing in a given slot. See FIG. 8 illustrating use of a respective wireless channel by multiple wireless stations.

Referring again to FIGS. 1 and 4, note that, in one embodiment, the ED (Energy Detect) Threshold implemented by wireless station CD21 may be determined as: $-85+10*\log 10$ (BW)+P+ACP dBm, where BW is the adjacent channel bandwidth in MHz, P=23−Device's Tx EIRP in dBm, where the value ACP is an Adjacent Channel Protection Ratio in dB that depends on the aggressor and victim RF filters. Note that the ACP value may be around 50 dB for immediately adjacent channels, while for UE to UE interference ACP value may be around 30 dB. ACP may also include the effect of further adjacent channels.

As further discussed below, if the wireless station CD21 detects that the amount of energy in the wireless channels #1 or #3 for the timeslot 31-7 (such as at a beginning portion of the timeslot) is above a threshold value, such as indicating that the wireless station CD21 would or likely interfere with communications in the wireless channel #1 or #3 because one or more other wireless stations use the wireless channel #1 or #3 in the timeslot 31-7 or co-channel interference is likely high during the timeslot 31-7, the wireless station CD21 prevents transmitting wireless communications in the timeslot 31-7 as further discussed below.

Figure 5:
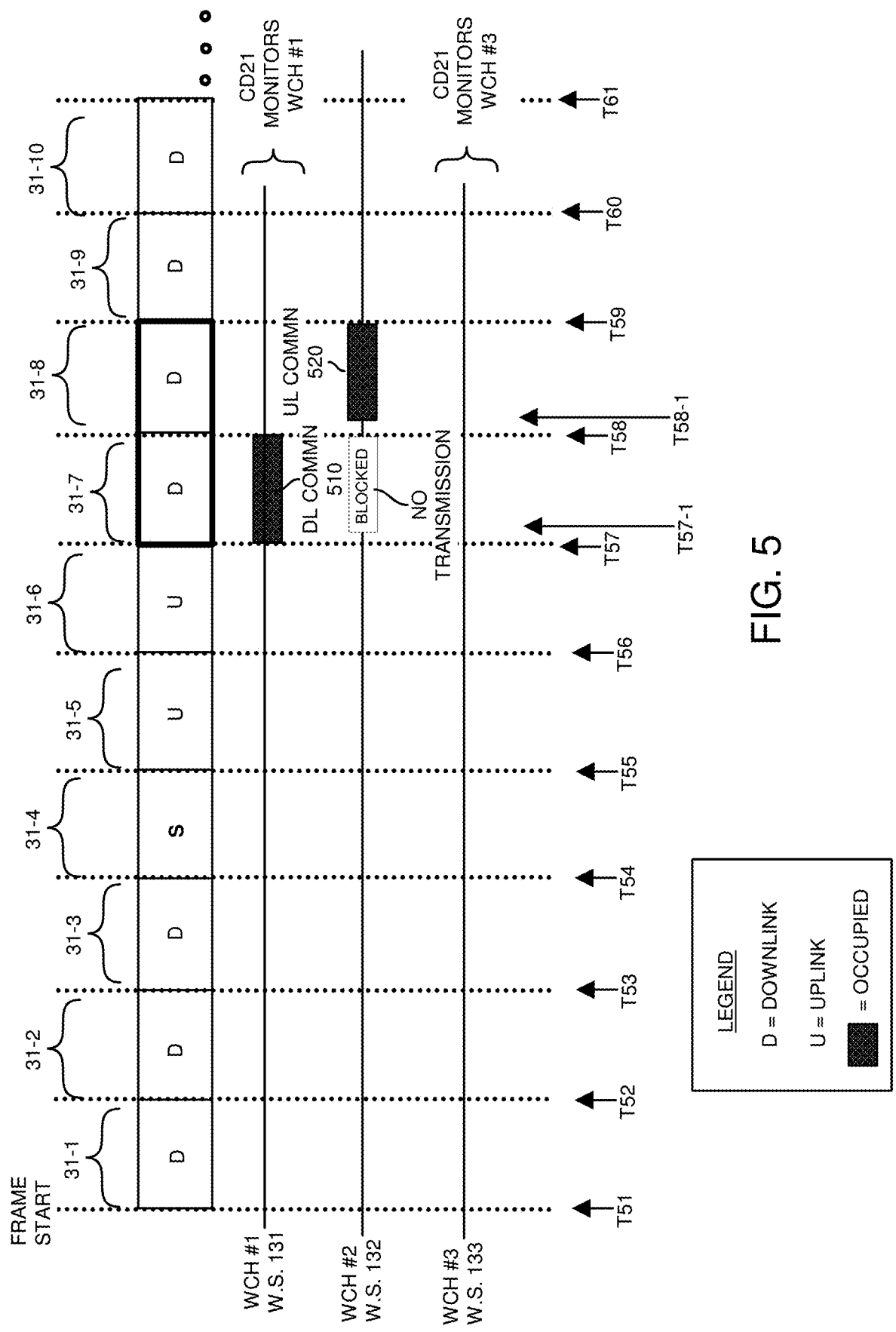
FIG. 5 is an example diagram illustrating monitoring of adjacent wireless channels and dynamic use of an assigned wireless channel according to embodiments herein.

FIG. 5 is an example diagram illustrating monitoring of adjacent wireless channels and dynamic use of an assigned wireless channel according to embodiments herein.

Assume in this example embodiment that the wireless station 132 allocates wireless station CD21 use of the wireless channel #2 and corresponding timeslot 31-7 and timeslot 31-8 for its use. In one embodiment, the wireless station CD21 and/or wireless station 132 register with the allocation management resource 141 to use one or more wireless channels.

As previously discussed, the timeslot 31-7 is, according to TDD configuration frame 322 a downlink timeslot, meaning that the wireless station 132 is able to communicate in the downlink direction to the communication device CD21 without interfering with other wireless stations. However, in this example embodiment, the wireless station CD21 desires to use the timeslot to communicate in an uplink direction from the communication device CD21 to the wireless station 132.

As previously discussed with respect to FIG. 1, communications wirelessly transmitted from the communication device CD21 in an uplink to the wireless base station 132 may result in cross interference with respect to other wireless stations using the same timeslot 31-7.

Referring again to FIG. 5, in this example embodiment, in order for the wireless station CD21 to communicate in the uplink direction instead of receiving data in the downlink direction assigned to the timeslot 31-7 of configuration frame 322, the wireless station CD21 needs to make sure that it will not interfere with other wireless stations in the network environment 100 as further discussed below.

Note that the wireless station CD21 can be configured to monitor any portion of a respective allocated timeslot (such as beginning, middle, and, etc.). In one embodiment, the first wireless station monitors the first wireless channel during a beginning portion of the time slot for presence of the wireless energy.

For example, in a similar manner as previously discussed, to prevent occurrence of co-channel interference, the wireless station CD21 allocated use of the timeslot 31-7 monitors the timeslot 31-7 for communications in adjacent wireless channels #1 and #3. In one embodiment, the wireless station 132 and/or allocation management resource 141 grant the wireless station CD21 permission to monitor these adjacent wireless channels. Because the timeslot 31-7 has been assigned for use by the wireless station CD21, it is known or at least assumed that no other nearby wireless stations will communicate in timeslot 31-7 so there is no need for the wireless station CD21 to monitor wireless channel #2. The wireless station 132 is able to communicate with the wireless station CD21 in the downlink without concern to other wireless stations. However, communications in the opposite direction of the allocated downlink direction (such as in the uplink direction from the wireless station CD21 to the wireless station 132) for timeslot 31-7 may result in cross wireless interference to the other wireless stations assigned wireless channels #1 and 3 in timeslot 31-7.

In one embodiment, as previously discussed, the wireless station CD21 receives notice of a wireless channel #2 and a time slot 31-7 allocated for use by the wireless station CD21 via communications from the wireless station 132. The wireless station CD21 also receives notification (such as permission) from the wireless station 132 to monitor wireless channel #1 and/or wireless channel #3 such as channels adjacent to the wireless channel #2 if the uplink of communications is needed. Wireless station CD21 is not allowed to communicate over the wireless channels #1 and #3, but may monitor them based on a grant of permission by wireless station 132, allocation management resource 141, or other suitable entity.

At or around time T57, prior to transmitting in the uplink from the wireless station CD21 to the wireless station 132, the wireless station CD21 monitors for presence of wireless energy during the time slot 31-7. Based on a detected level of the wireless energy during such time, the wireless station CD21 controls transmission of wireless communications from the wireless station CD21 to the wireless station 132.

In this example embodiment, the wireless station CD21 detects presence of wireless energy in the wireless channel #1 above an energy detect threshold level. In response to detecting this condition, the wireless station CD21 is prevented or blocked from transmitting wireless communications in an uplink direction from the wireless station CD21 to the wireless station 132. As previously discussed, this prevents cross channel interference with respect to the downlink communications 510 from the wireless station 131 to a respective communication device in network environment 100. Thus, the wireless station CD21 does not transmit in the uplink in timeslot 31-7.

Further in this example embodiment, assume that the wireless station CD21 is also signed use of timeslot 31-8. In a similar manner as previously discussed, the wireless station CD21 monitors presence of wireless energy in a wireless channel #1 and wireless channel #3 such as between there is time T58 and time T58-1. In this instance, the wireless station CD21 does not detect presence of wireless communications above a respective energy threshold value in either monitored channel #1 or #3. In such an instance, at or around time T58-1, the wireless station CD21 transmits uplink communications 520 from the wireless station CD21 to the wireless station 132.

Thus, when there is no chance or low probability of causing co-channel interference with another wireless station, the corresponding wireless link can be used in an uplink or downlink direction (opposite an original designation direction) as opposed to be restricted to only a single direction.

In still further example embodiments, the wireless base station 132 or other suitable entity communicates control information (such as schedule information) to the wireless station CD21 indicating whether to use the timeslot 31-7 in the uplink direction or the downlink direction. The allocated use of the timeslot 31-7 depends upon whether it is more desirable for the wireless station 132 to communicate data to the wireless station CD21 or more desirable that the wireless station CD21 communicate data to the wireless station 132. Thus, the wireless station 132 or other suitable entity can be configured to dynamically control whether to use the allocated timeslot for uplink communications or downlink communications.

Figure 6:
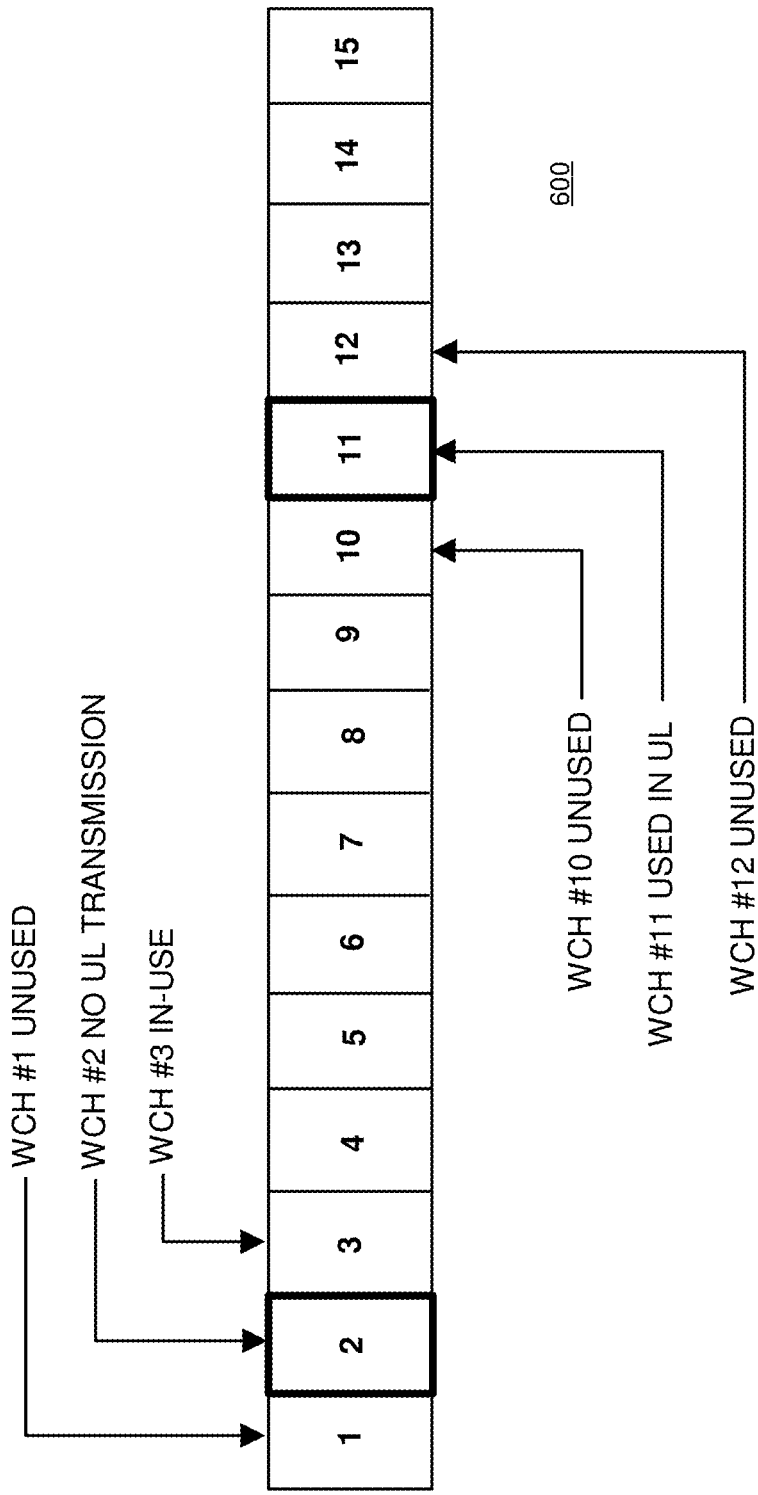
FIG. 6 is an example frequency diagram illustrating monitoring of adjacent wireless channels and dynamic use of a wireless channel according to embodiments herein.

FIG. 6 is an example frequency diagram illustrating monitoring of adjacent wireless channels and dynamic use of a wireless channel according to embodiments herein.

Graph 600 of FIG. 6 illustrates that a device using wireless channel #2 may not transmit in the opposite direction in a respective timeslot because wireless channel #3 is being used by another wireless station. Wireless channel #1 is not used.

Conversely, a wireless station assigned wireless channel #11 monitors both adjacent wireless channels 10 and 12. The timeslot is designated as a downlink timeslot. In response to detecting a condition in which detected wireless energy in each of the wireless channels 10 and 12 is below a threshold level for a first portion of an assigned timeslot, the wireless station communicates in the uplink direction to a respective wireless base station. Thus, a wireless device using channel 11 may transmit in the opposite direction as both Channels 10 and 12 are unoccupied in the given slot.

In one embodiment, the implemented ED threshold level depends on device EIRP and ACP. For example, for a BS with 50 dB ACP wanting to transmit with 63 dBm EIRP over 10 MHz channel, ED threshold=−85+10+23−63+50=−65 dB For an EUD with 30 dB ACP wanting to transmit with 23 dBm EIRP over 20 MHz channel, ED threshold=−85+13+23−23+30=−42 dBm Note further that a wireless station may adapt its transmission power/EIRP to find more opportunities for channel access.

Figure 7:
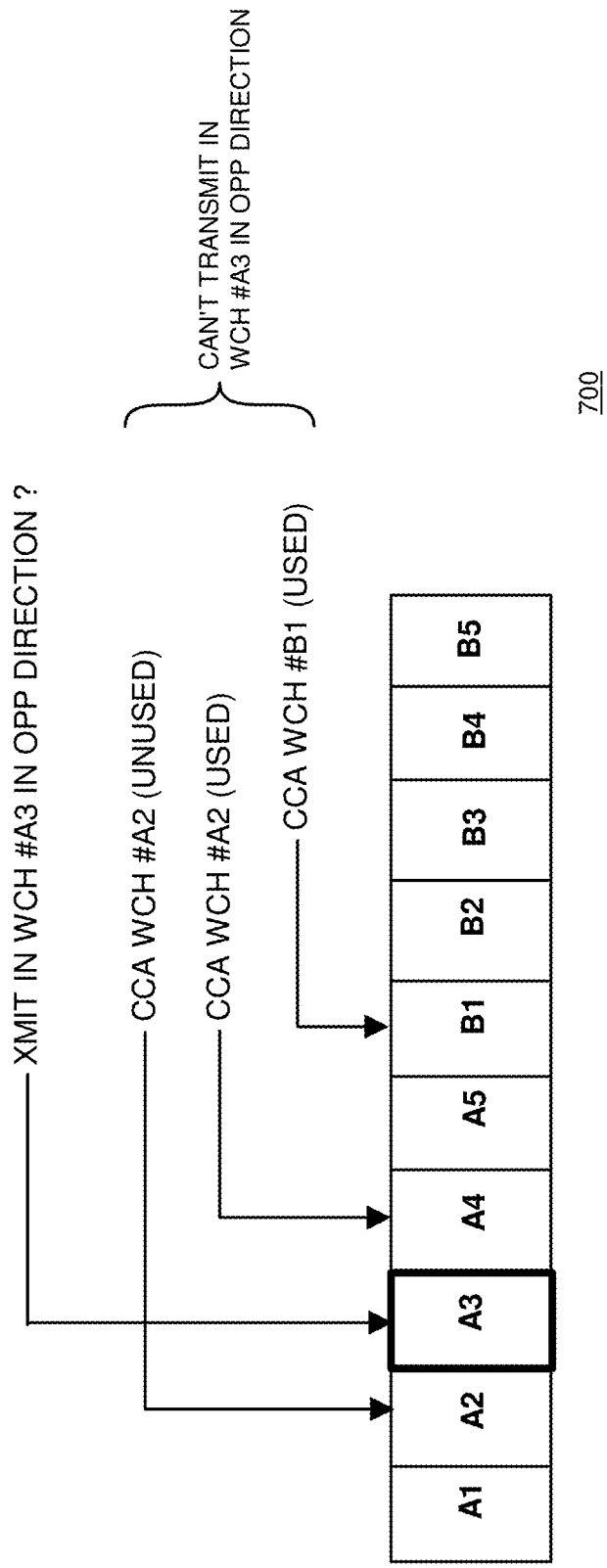
FIG. 7 is an example diagram illustrating a wireless station monitoring one or more adjacent wireless channels in a first wireless band as well as monitoring one or more wireless channels in a second wireless band according to embodiments herein.

FIG. 7 is an example diagram illustrating a wireless station monitoring one or more adjacent wireless channels in a first wireless band as well as monitoring one or more wireless channels in a second wireless band according to embodiments herein.

Note that, in accordance with further example embodiments in graph 700, the hybrid TDD access techniques as discussed herein can be implemented without CxM/SAS. For example, in accordance with alternative embodiments, a first wireless communication system supports wireless channels A1, A2, A3, A4, and A5. A second wireless communication system supports wireless channels B1, B2, B3, before, and B5.

In this embodiment, there may not be any CxM/SAS to control TDD Configuration. Instead, there may be an agreement among operators implementing the different wireless communication systems using the different bandwidths A and B to coordinate their TDD configuration. For example, in such an embodiment, service providers (i.e., operators) agree to access their channels using hybrid TDD access as discussed herein:

This includes conventional TDD access in slots/subframes/special subframe symbols with the same direction as coordinated by the operators, i.e. UL with UL, or DL with DL Channel sensing based access in slots/subframes/special subframe symbols with the opposite direction as coordinated by the operators, i.e. DL with UL, or UL with DL In still further example embodiments, channel sensing based access may be implemented in a manner as previously discussed for frequency blocks adjacent to the device's transmission frequencies.

Note further that a respective wireless station may be required to check channel occupancy of adjacent frequency channels/blocks as well as frequency blocks/channels in adjacent bands. More specifically, in a manner as previously discussed, the wireless station trying to communicate in the opposite direction of an original direction assignment via wireless channel #A3 checks presence of wireless energy in wireless channels A2 to and A4. Additionally, the wireless station checks the wireless energy of communications present in the wireless channel #B1 (and/or one or more of the other wireless channels B2, B3, B4, etc.). If the wireless station trying to communicate in an opposite direction in the wireless channel #A3 detects wireless energy levels above a respective threshold level for any of the monitored wireless channels A2, A4, B1, the wireless station is not permitted to transmit over wireless channel #3 in the opposite direction. Conversely, if the wireless station trying to communicate in an opposite direction in the wireless channel #A3 detects wireless energy levels below a respective threshold level for all of the monitored wireless channels A2, A4, B1, the wireless station transmits wireless communications over wireless channel #3 in opposite direction aim as previously discussed.

Thus, FIG. 7 shows a device using Channel A3 in the opposite direction after checking for channel occupancy in its immediately adjacent channels and the first channel in adjacent band, i.e. B1.

As previously discussed, if any of the CCA (a.k.a., listen before talk) monitoring by the wireless station fails, the device can't transmit in Channel A3 in the opposite direction.

FIG. 8 is an example diagram illustrating multiple wireless stations sharing use of an assigned wireless channel and monitoring of one or more adjacent wireless channels according to embodiments herein.

In this example embodiment, the wireless station 132 assigns use of wireless channel #2 by both the wireless station CD21 and wireless station CD22. Assume in this example embodiment that both the wireless station CD21 and CD22 are potentially allowed to communicate in the uplink direction to the wireless station 132 during assigned time slots 31-7 and 31-8. In such an instance, each of the wireless stations CD21 and CD22 monitors the adjacent wireless channels #1 and #3 for presence of energy in a manner as previously discussed. The wireless station 131 or corresponding communication device transmits wireless communications over a wireless channel #1 in timeslot 31-7. In such an instance, both of the wireless station CD21 and CD22 monitoring wireless channels #1 and #3 detect that the energy in the adjacent wireless channel #1 is above a respective threshold value. Based on detecting this condition, both the wireless station CD21 and the wireless station CD22 prevent communications in the uplink direction to the wireless station 132 in timeslot 31-7.

Assume further in this example embodiment that both the wireless station CD21 and CD22 would like to communicate in the uplink direction to the wireless station 132 during assigned time slot 31-8. In such an instance, each of the wireless stations CD21 and CD22 monitors the adjacent wireless channels #1 and #3 for presence of energy in timeslot 31-8 in a manner as previously discussed. In this example embodiment, there are no wireless communications transmitted in timeslot 31-8 over wireless channel #1 or wireless channel #3. In this instance, both of the wireless station CD21 and CD22 detect that the energy in the adjacent wireless channel #1 and wireless channel #3 is below a respective threshold value. Based on detecting this condition, both the wireless station CD21 and the wireless station CD22 may attempt to communicate in wireless channel #2 in the uplink direction. In one embodiment, to prevent a collision, this includes both of the wireless station CD21 and wireless station CD 22 monitoring the wireless channel #2 for communications via a listen before talk protocol. If desired, each of the communication devices implements a different random back off time so they do not both use the wireless channel #2 at the same time. For example, in this example embodiment, the wireless station CD21 implements a shorter random back off time when monitoring presence of wireless energy in timeslot 31-8 and wireless channel #2 so the wireless station CD21 transmits communications 820 in the uplink direction (opposite direction) to the wireless station 132. Wireless station CD22 detects the use of wireless channel #2 by the energy associated with the uplink communication 820 and, therefore, does not transmit in the uplink during timeslot 31-8. This prevents a respective collision of both the wireless station CD21 and the wireless station CD22 communicating in the uplink direction and over wireless channel #2 in timeslot 31-8.

The embodiments as shown in FIGS. 9-13 are similar to those as previously discussed except that the device performs sensing in its own channel of operation rather than adjacent channels.

Figure 9:
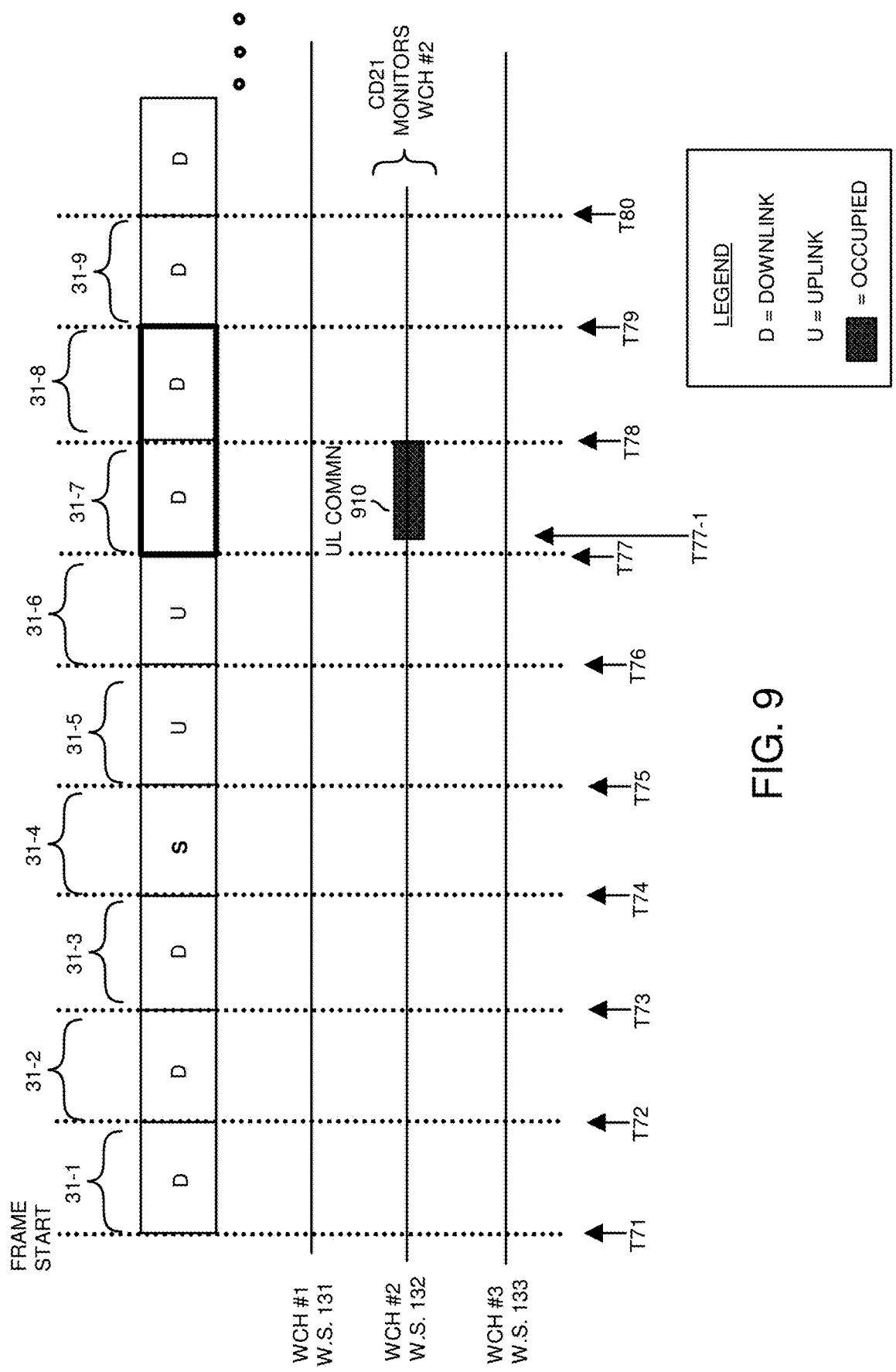
FIG. 9 is an example diagram illustrating monitoring of a respective assigned wireless channel to determine wireless interference and corresponding use of adjacent wireless channels according to embodiments herein.

More specifically, FIG. 9 is an example diagram illustrating monitoring of a respective assigned wireless channel to determine interference and corresponding use of adjacent wireless channels according to embodiments herein.

Note that Clear Channel Assessment (CCA) by Energy detection (ED) may be used to detect channel occupancy in own channel (co-channel sensing). As previously discussed, random backoff times may be used to avoid collision among users (wireless stations) employing channel sensing in a given slot.

In further example embodiments, it may be sufficient to implement CCA (Clear Channel Assessment) or listen before talk techniques in the assigned wireless channel in order to communicate in an opposite direction than as allocated by a communication management resource.

For example, as shown in FIG. 9, assume that the wireless station 132 allocates communication device CD21 use of the wireless channel #2 and corresponding timeslot 31-7 for its use. The timeslot 31-7 is a downlink timeslot, meaning that the wireless station 132 is able to communicate in the downlink direction to the communication device CD21 without interfering with other wireless stations. However, the wireless station 132 desires to use the timeslot to communicate in an uplink direction from the communication device CD21 to the wireless station 132.

As previously discussed with respect to FIG. 1, communications wirelessly transmitted from the communication device CD21 in an uplink to the wireless base station 132 may result in cross interference with respect to other wireless stations using the same timeslot 31-7 in an assigned downlink direction.

Referring again to FIG. 9, in order for the wireless station CD21 to communicate in the uplink direction instead of the downlink direction, the wireless station CD21 needs to make sure that it will not interfere with other wireless stations in the network environment 100. For example, to prevent occurrence of co-channel interference, the wireless station CD21 allocated use of the timeslot 31-7 monitors the timeslot 31-7 for communications in adjacent wireless channel #2. As previously discussed, wireless communications in the opposite direction of the allocated downlink (such as in the uplink from the wireless station CD21 to the wireless station 132) for timeslot 31-7 may result in cross wireless interference to the other wireless stations assigned wireless channels #1 and 3 in timeslot 31-7.

Thus, the wireless station CD21 receives notice of a wireless channel #2 and a time slot 31-7 allocated for use by the wireless station CD21.

At or around time T77, the wireless station CD21 monitors for presence of wireless energy during the time slot 31-7 in wireless channel #2. Based on a detected level of the wireless energy during such time, the wireless station CD21 controls transmission of wireless communications from the wireless station CD21 to the wireless station 132.

More specifically, a timeslot 31-7 may be allocated by a communication management resource associated with the wireless station 132 for use by a wireless station CD21. However, the allocated timeslot 31-7 may be for conveyance of wireless communications in an opposite direction in which the wireless station CD21 would like to use the corresponding wireless channel #2. In other words, the wireless station CD21 wishes to communicate in an uplink direction instead output downlink direction.

In such an instance, embodiments herein include, via the wireless station CD21 or other suitable entity, monitoring for energy in a vicinity of the wireless station CD21 or other suitable location during the timeslot 31-7 in wireless channel #2 and using such information as a basis in which to communicate from the wireless station CD21 to the wireless station 132. More specifically, in one embodiment, the wireless station CD21 monitors for presence of the wireless energy (such as caused by other wireless stations wirelessly communicating via wireless channels 1 and 3) in the wireless channel #2. To prevent wireless interference, the wireless station CD21 monitors the wireless channel #2 to determine if transmission of wireless communications in the timeslot 31-7 from the first wireless station would potentially cause interference with another wireless station.

More specifically, in this example embodiment, the wireless station CD21 monitors wireless channel #2. The energy in wireless channel #2 may be caused by co-channel interference from one or more wireless stations communicating in wireless channels #1 and #3. Based on monitoring of wireless channel #2, the wireless station CD21 detects that the amount of energy in the wireless channel #2 for the allocated timeslot 31-7 (such as at a beginning portion of the timeslot 31-7 such as between time T 77 and time T 77-1) is below a threshold value, such as indicating that the wireless station CD21 will not interfere with communications in the wireless channels #1 and #3 because no other wireless stations use the second wireless channel in the timeslot 31-7 or co-channel interference is low during the timeslot 31-7, the wireless station CD21 uses the timeslot 31-7 of the wireless channel #2 to transmit wireless communications 310 from the wireless station CD21 (such as user equipment or a mobile communication device) to the wireless station 132 (such as a wireless base station).

In one embodiment, the ED Threshold may be determined as: −85+10*log 10(BW)+P dBm.

For high power/EIRP transmission, for example from a macro cell BS, it may not be possible to do co-channel sensing as the ED threshold gets below noise level. In this case adjacent channel sensing may be used. For example, for a BS wanting to transmit with 63 dBm EIRP over 10 MHz channel, ED threshold for co-channel sensing=−85+10+23−63=−115 dB (below noise level ~−99 dBm).

For low power/EIRP transmission, for example from a UE or small cell BS, co-channel sensing may be used.

For an EUD wanting to transmit with 23 dBm EIRP over 20 MHz channel, ED threshold for co-channel sensing=−85+13+23−23=−72 dBm.

Figure 10:
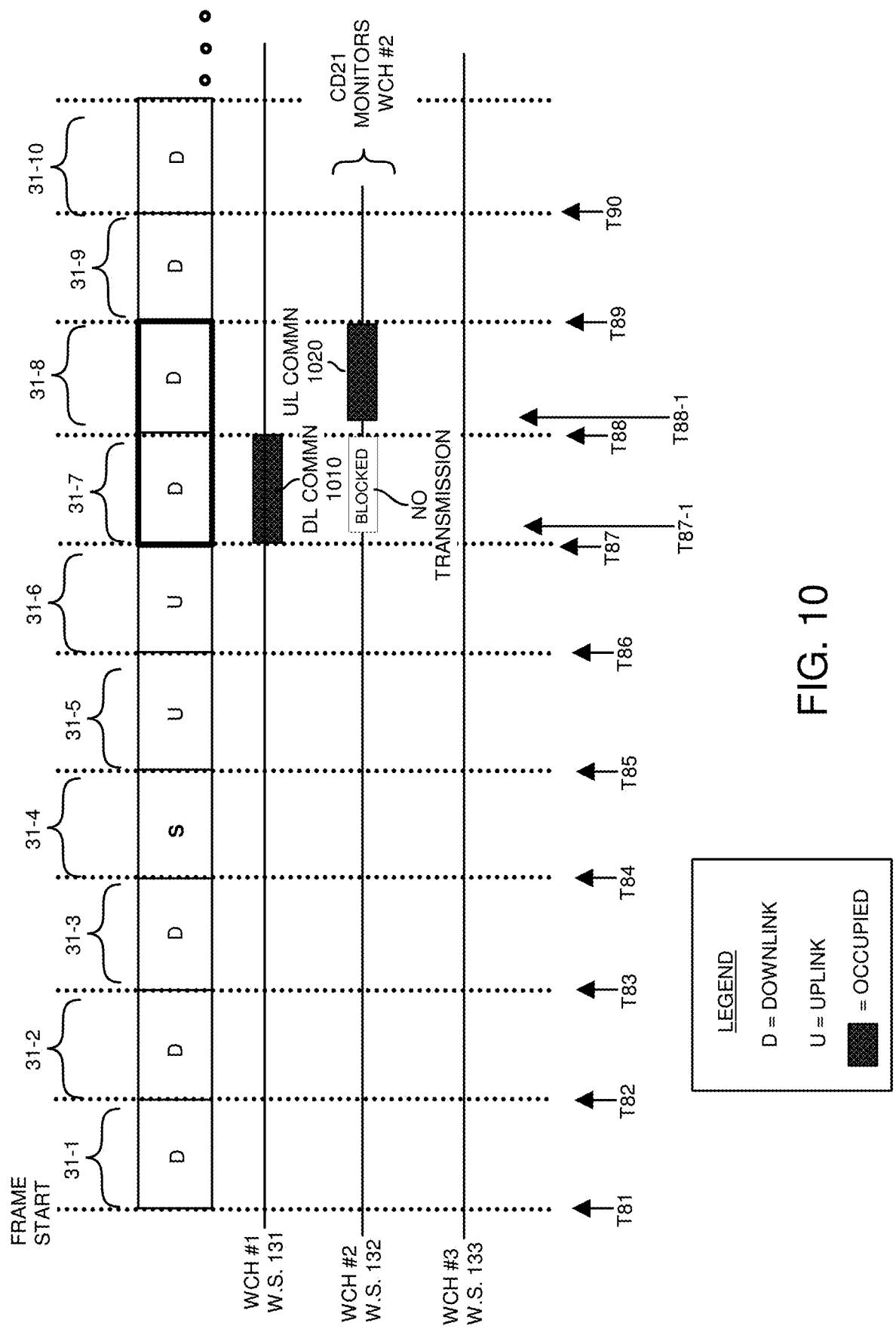
FIG. 10 is an example diagram illustrating monitoring of a respective assigned wireless channel to determine interference and corresponding use of adjacent wireless channels according to embodiments herein.

FIG. 10 is an example diagram illustrating monitoring of a respective assigned wireless channel to determine interference and corresponding use of adjacent wireless channels according to embodiments herein.

Assume in this example embodiment that the wireless station 132 allocates wireless station device CD21 use of the wireless channel #2 and corresponding timeslot 31-7 and timeslot 31-8 for its use. In one embodiment, the wireless station CD21 and/or wireless station 132 register with the allocation management resource 141 to use one or more wireless channels.

As previously discussed, the timeslot 31-7 is, according to TDD configuration frame 322 a downlink timeslot, meaning that the wireless station 132 is able to communicate in the downlink direction to the communication device CD21 without interfering with other wireless stations. However, the wireless station CD21 desires to use the timeslot to communicate in an uplink direction from the communication device CD21 to the wireless station 132.

As previously discussed with respect to FIG. 1, communications wirelessly transmitted from the wireless station CD21 in an uplink to the wireless base station 132 may result in cross interference with respect to other wireless stations using the same timeslot 31-7 in an assigned downlink direction of, for example, wireless channels #1 and #3.

Referring again to FIG. 10, in order for the wireless station CD21 to communicate in the uplink direction instead of the downlink direction assigned to the timeslot 31-7 of configuration frame 322, the wireless station CD21 needs to make sure that it will not interfere with other wireless stations in the network environment 100.

Note that the wireless station CD21 can be configured to monitor any portion of a respective allocated timeslot (such as beginning, middle, and, etc.). In one embodiment, the first wireless station monitors the first wireless channel during a beginning portion of the time slot for presence of the wireless energy.

For example, to prevent recurrence of co-channel interference, the wireless station CD21 allocated use of the timeslot 31-7 monitors the timeslot 31-7 for communications in wireless channel #2.

At or around time T87, prior to transmitting in the uplink from the wireless station CD21 to the wireless station 132, the wireless station CD21 monitors for presence of wireless energy during the time slot 31-7 via monitoring the wireless channel #2 for co-channel interference caused by wireless communications over wireless channels #1 and #3 from other wireless stations. Based on a detected level of the wireless energy in timeslot 31-7 of wireless channel #2 during such time, the wireless station CD21 controls transmission of wireless communications from the wireless station CD21 to the wireless station 132.

In this example embodiment, the wireless station CD21 detects presence of wireless energy in the wireless channel #2 above an energy detect threshold level. In response to detecting this condition, the wireless station CD21 is prevented or blocked from transmitting wireless communications in an uplink direction from the wireless station CD21 to the wireless station 132. As previously discussed, the blocking prevents cross channel interference with respect to the downlink communications 1010 from the wireless station 131 to a respective communication device in network environment 100. Thus, the wireless station CD21 does not transmit in the uplink in timeslot 31-7.

Further in this example embodiment, assume that the wireless station CD21 is also signed use of timeslot 31-8. In a similar manner as previously discussed, the wireless station CD21 monitors presence of wireless energy in wireless channel #2. In this instance, the wireless station CD21 does not detect presence of wireless communications above an energy threshold value in the monitored wireless channel #2. In such an instance, at or around time T88-1, the wireless station CD21 transmits uplink communications 1020 from the wireless station CD21 to the wireless station 132.

Thus, when there is no chance or low probability of causing co-channel interference with another wireless station, the corresponding wireless link can be used in an uplink or downlink direction as opposed to be restricted to only a downlink direction.

Figure 11:
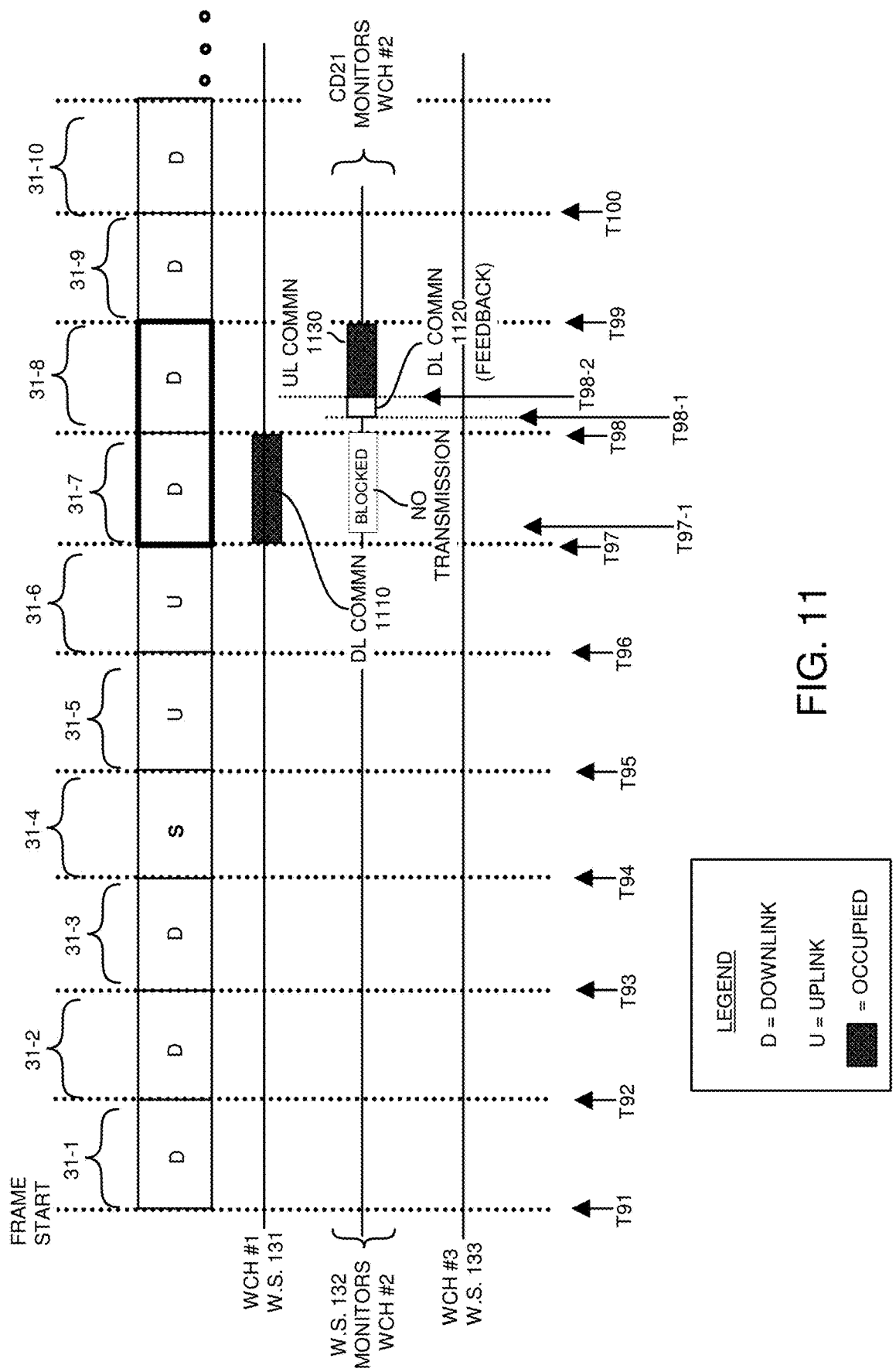
FIG. 11 is an example diagram illustrating monitoring of a respective assigned wireless channel by one or more wireless stations to determine interference and corresponding use of adjacent wireless channels according to embodiments herein.

FIG. 11 is an example diagram illustrating monitoring of a respective assigned wireless channel to determine interference and corresponding use of adjacent wireless channels according to embodiments herein.

In this example embodiment, the wireless station 132 monitors presence of wireless energy in wireless channel #2 for presence of wireless interference caused by one or more other wireless stations communicating in the timeslots 31-7 and 31-8. In this example embodiment, the wireless station 132 provides feedback to the wireless station CD21 whether the wireless station 132 detects use of wireless channels #1 and #3.

More specifically, assume in this example embodiment that the wireless station 132 allocates wireless station CD21 use of the wireless channel #2 and corresponding timeslot 31-7 and timeslot 31-8 for its use. In one embodiment, the wireless station CD21 and/or wireless station 132 register with the allocation management resource 141 to use one or more wireless channels.

As previously discussed, the timeslot 31-7 is, according to TDD configuration frame 322 a downlink timeslot, meaning that the wireless station 132 is able to communicate in the downlink direction to the communication device CD21 without interfering with other wireless stations. However, the wireless station CD21 desires to use the timeslot to communicate in an uplink direction (opposite with respect to the downlink direction) from the wireless station CD21 to the wireless station 132.

As previously discussed with respect to FIG. 1, communications wirelessly transmitted from the wireless station CD21 in an uplink to the wireless base station 132 may result in cross interference with respect to other wireless stations using the same timeslot 31-7 in an assigned downlink direction of, for example, wireless channels #1 and #3.

Referring again to FIG. 11, in order for the wireless station CD21 to communicate in the uplink direction instead of the downlink direction assigned to the timeslot 31-7 of configuration frame 322, the wireless station CD21 needs to make sure that it will not interfere with other wireless stations and wireless channels in the network environment 100.

Note that the wireless station CD21 can be configured to monitor any portion of a respective allocated timeslot (such as beginning, middle, and, etc.). In one embodiment, the first wireless station monitors the first wireless channel during a beginning portion of the time slot for presence of the wireless energy.

For example, to prevent occurrence of co-channel interference, the wireless station CD21 allocated use of the timeslot 31-7 monitors the timeslot 31-7 for communications in wireless channel #2.

At or around time T97 to time T97-1, prior to transmitting in the uplink from the wireless station CD21 to the wireless station 132, the wireless station CD21 monitors for presence of wireless energy during the time slot 31-7 via monitoring the wireless channel #2 for co-channel interference caused by wireless communications over wireless channels #1 and #3. Based on a detected level of the wireless energy in timeslot 31-7 of wireless channel #2 above a threshold level during such time, the wireless station CD21 prevents transmission of wireless communications from the wireless station CD21 to the wireless station 132.

Thus, in this example embodiment, the wireless station CD21 detects presence of wireless energy in the wireless channel #2 above an energy detect threshold level while monitoring the timeslot 31-7. In response to detecting this condition, the wireless station CD21 is prevented or blocked from transmitting wireless communications in an uplink direction from the wireless station CD21 to the wireless station 132. As previously discussed, this prevents cross channel interference with respect to the downlink communications 1110 from the wireless station 131 to a respective communication device in network environment 100. Thus, the wireless station CD21 does not transmit in the uplink in timeslot 31-7.

Further in this example embodiment, as previously discussed, assume that the wireless station CD21 is also signed use of timeslot 31-8. In a similar manner as previously discussed, the wireless station CD21 monitors presence of wireless energy in a wireless channel #2 for the timeslot 31-8 between time T98 and T98-1. In this instance, the wireless station CD21 does not detect presence of wireless communication energy in wireless channel #2 above and energy threshold value. As further shown, the wireless station 132 also monitors the wireless channel #2 for presence of cross-channel interference caused by other wireless stations communicating over wireless channels #1 and/or wireless channel #3 during timeslot 31-8. In this example embodiment, assume that the wireless station 132 also does not detect presence of energy in the wireless channel #2 above a respective threshold value for timeslot 31-8 (monitoring between time T98 and time T98-1). As a response this condition, the wireless station 132 transmits a respective communication 1120 (feedback) to the wireless station CD21. The communication 1120 (feedback) indicates that the wireless station did not detect presence of wireless energy between time T98 and time T98-1. As previously discussed, the wireless station CD 21 also monitors the wireless channel #2 for adjacent channel interference and also does not detect presence of wireless energy of above a respective threshold level at the beginning of timeslot 31-8.

In one embodiment, the wireless station 132 monitors presence of wireless energy between time T98 and time T98-1 in wireless channel #2. In response to detecting that the measured energy is below a threshold value, the wireless station 132 communicates a respective notification to the communication device CD 21 indicating that the presence of wireless energy was detected in the corresponding wireless channel #2 as being below a respective threshold value. In response to receiving the notification, the communication device CD 21 then monitors the timeslot 31-8 of wireless channel #2 for presence of wireless energy to ensure that the respective wireless channel #2 is clear. In response to the communication device CD 21 also detecting that the energy level in the wireless channel #2 is below a respective threshold value, the communication device CD 21 transmits communications 1130 over wireless channel #2 to the wireless base station 132.

In further example embodiments, in response to detecting that the wireless energy in the timeslot 31-8 is below and energy threshold level and receiving the communication 1120 indicating that the wireless station 132 also detects that the wireless energy and wireless channel over wireless channel #2 is below a respective energy threshold from the perspective of the wireless station 132, the wireless station CD21 is then able to communicate in the timeslot 31-8 in an uplink direction between time T98-2 and T99 (that is, a remaining portion of the respective timeslot 31-8).

Thus, when there is no chance or a low probability of the wireless station CD21 causing wireless interference with another wireless station, the corresponding wireless link can be used in an opposite assigned direction as opposed to be restricted to only a single direction as specified by the time-division duplex configuration.

Additionally, or alternatively, in accordance with further example embodiments, note that the wireless station 132 can be configured to monitor wireless channel #1 and wireless channel #3 at a beginning of a respective timeslot in order to determine if another wireless station uses the adjacent wireless channels. In this latter instance, if the level of energy detected in the wireless channel #1 and the wireless channel #3 fall below a respective threshold level, the wireless station 132 transmits communication 1120 to the wireless station CD21 indicating that wireless channels #1 and #3 are free from use.

The extra level of monitoring of the wireless channel #2 and/or wireless channels #1 and #3 by the wireless station 132 ensures that communications in the uplink direction from the wireless station CD21 to the wireless station 132 in timeslot 31-8 do not cause interference to other wireless stations.

Figure 12:
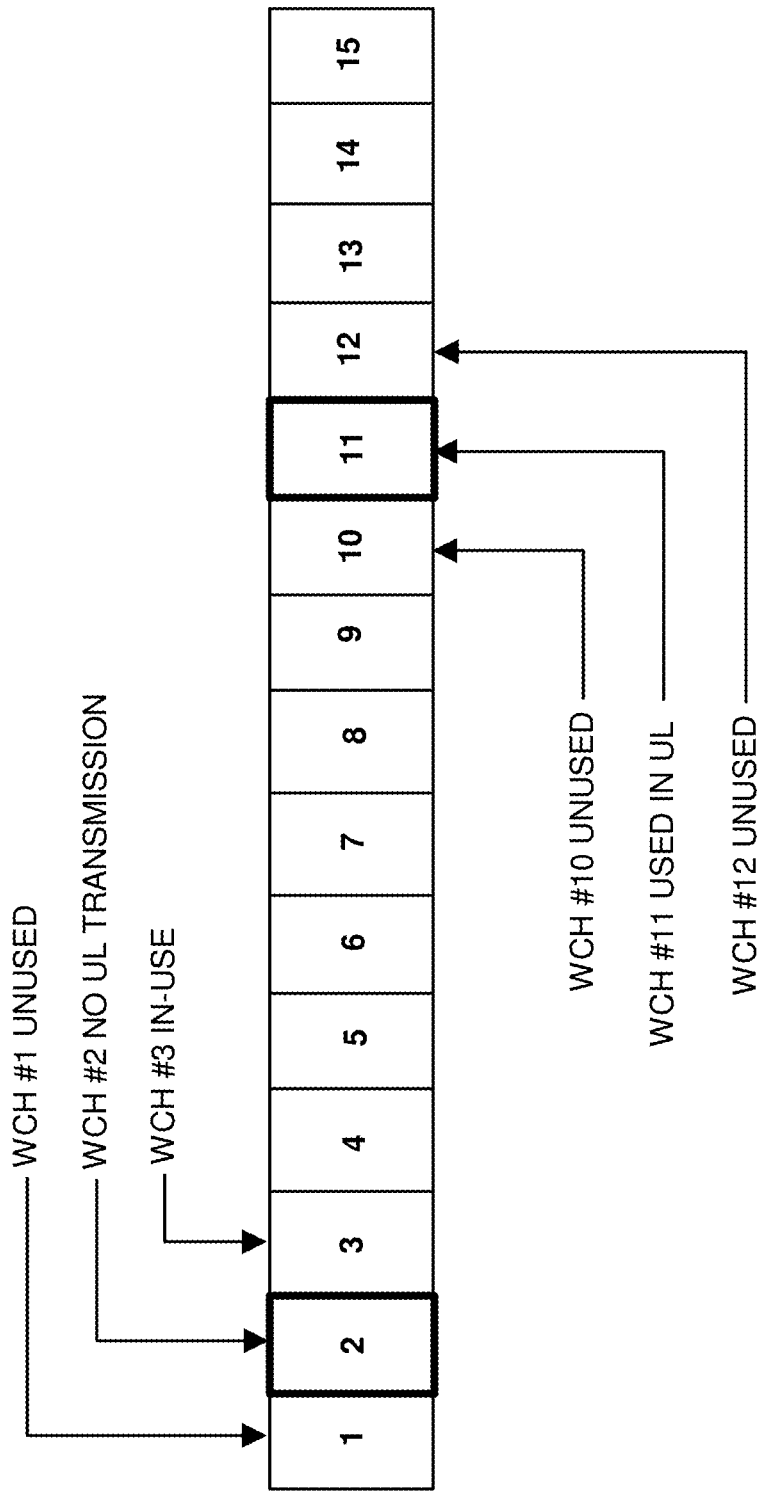
FIG. 12 is an example frequency diagram illustrating monitoring of adjacent wireless channels and dynamic use of a wireless channel according to embodiments herein.

FIG. 12 is an example frequency diagram illustrating monitoring of an allocated wireless channel according to embodiments herein.

Graph 1200 of FIG. 12 illustrates that a device using wireless channel #2 may not transmit in the opposite direction in a respective timeslot because, when monitoring wireless channel #2 for cross interference wireless energy from wireless channels #1 and 3, wireless channel #3 is being used by another wireless station. In any suitable manner as previously discussed, the wireless station CD21 and/or wireless station 132 detects this condition via monitoring of wireless channel #2 because the transmission of wireless communications in wireless channel #3 causes detection of energy in wireless channel #2. Wireless channel #1 is not used.

Conversely, a wireless station assigned wireless channel 11 monitors wireless channel 11 to determine if adjacent wireless channels 10 and 12 are being used. The timeslot is designated as a downlink timeslot. In response to detecting a condition in which detected wireless energy in the wireless channel 11 is below a threshold level for a first portion of an assigned timeslot such as detected by the end user wireless station and/or corresponding wireless base station, the wireless end user wireless station communicates in the uplink direction to a respective wireless base station. Thus, a wireless station using channel 11 may transmit in the opposite direction as both Channels 10 and 12 are unoccupied for a given slot.

Figure 13:
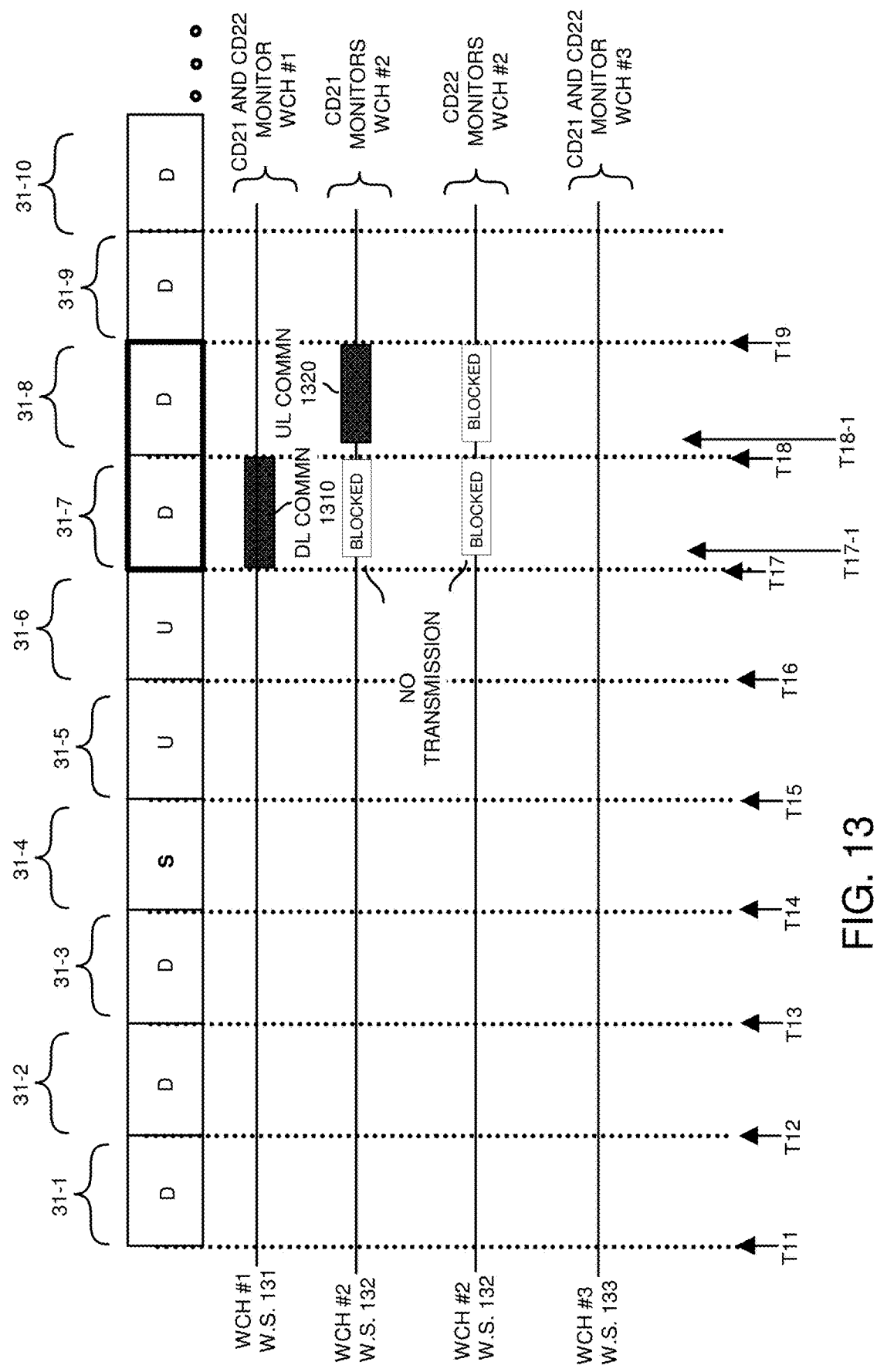
FIG. 13 is an example diagram illustrating multiple wireless stations sharing use of an assigned wireless channel and monitoring of one or more adjacent wireless channels according to embodiments herein.

FIG. 13 is an example diagram illustrating multiple wireless stations sharing use of an assigned wireless channel and monitoring of one or more adjacent wireless channels according to embodiments herein.

In this example embodiment, the wireless station 132 assigns use of wireless channel #2 to both the wireless station CD21 and wireless station CD22. Assume in this example embodiment that both the wireless station CD21 and CD22 are scheduled or at least able to communicate in the uplink direction to the wireless station 132 during assigned time slots 31-7 and 31-8 if the adjacent channels are clear from use. In this example embodiment, instead of monitoring adjacent wireless channels #1 and #3, each of the wireless stations CD21 and CD22 monitors the wireless channel #2 for presence of co channel interference energy caused by a respective wireless station communicating in the wireless channels #1 and #3 in timeslot 31-7. In this embodiment, the wireless station 131 or corresponding communication device transmits wireless communications over a wireless channel #1 in timeslot 31-7. In such an instance, both of the wireless station CD21 and CD22 monitoring wireless channel #2 detect that the energy in the wireless channel #2 caused by the communications 1310 is above a respective threshold value. Based on detecting this condition, both the wireless station CD21 and the wireless station CD22 know that another wireless station communicates in the timeslot 31-7 in the other wireless channels 1 and 3 and, therefore, prevent communications in the uplink direction to the wireless station 132 in timeslot 31-7.

Assume further in this example embodiment that both the wireless station CD21 and CD22 would like to communicate in the uplink direction to the wireless station 132 during assigned time slot 31-8. In such an instance, each of the wireless stations CD21 and CD22 monitors the wireless channel #2 for presence of energy in a manner as previously discussed. In this example embodiment, there are no wireless communications transmitted in timeslot 31-8 over wireless channel #1 or wireless channel #3. In this instance, both of the wireless station CD21 and CD22 detect that the energy in the wireless channel #2 is below a respective threshold value. Based on detecting this condition, both the wireless station CD21 and the wireless station CD22 attempt to or would like to communicate in wireless channel #2 in the uplink direction (opposite the downlink configuration for the timeslot). In one embodiment, this includes both of the wireless station CD21 and wireless station CD 22 monitoring the wireless channel #2 for communications via a listen before talk protocol. If desired, each of the communication devices implements a different random back off time so they do not both use the wireless channel #2 at the same time.

For example, in this example embodiment, the wireless station CD21 implements a shorter random back off time when monitoring presence of wireless energy in timeslot 31-8 and wireless channel #2 so the wireless station CD21 transmits communications 1320 in the uplink direction (opposite direction) to the wireless station 132. Wireless station CD22 detects the use of wireless channel #2 by the energy associated with the uplink communication 1220 and, therefore, does not transmit in the uplink during timeslot 31-8. This prevents a respective collision of both the wireless station CD21 and the wireless station CD22 communicating in the uplink direction and over wireless channel #2 in timeslot 31-8.

Additional Embodiments

Referring again to FIG. 1, note that the Hybrid TDD access (such as implementing configuration frame 321 and configuration frame 322) as shown may include implementing some signaling for the gNB and UE to stay aligned on time/frequency domain configurations and grants.

For example, in one embodiment, in a manner as previously discussed, the wireless station 132 (such as gNB) can be configured to override the nominal TDD configuration (such as configuration frame 321 and implement configuration frame 322). In such an instance, a nominal 'D' slot needs to be changed to a 'U with adjacent channel sensing' slot in order for a UE to perform UL CCA on the adjacent channel. If this change is not made, the UE is expected to monitor DL transmissions in that slot which would preclude UL transmission.

Note further that in existing PDCCH-based slot format indicator (SFI) signaling (DCI Format 2_0) in NR can be used for overriding the nominal TDD config. However, according to conventional techniques, only 'F' slots (flexible slots) can be overridden, not 'D' or 'U'. Changing 'D' to 'U' or 'U' to 'D' via SFI requires a new procedure that can also indicate to the UE that channel sensing is to be performed. The parameters for channel sensing (ED threshold, CCA duration, etc.) can be configured separately via RRC signaling or other suitable signaling.

In further example embodiments, the wireless base station such as a gNB schedules UEs by means of scheduled grants or configured grants. A scheduled grant may or may not be used by a UE (a.k.a., wireless station) depending on CCA (listen before talk) success in a slot requiring channel sensing. In an example, the gNB may configure configured grant (CG) resources for the slots that intends to possibly override the nominal TDD configuration (where it is expected to happen periodically). The additional behavior of the UE for using the CG resources is to first check for CCA (listen before talk) success in the slot or right before the CG resource. Additional behavior of the UE may be checking for signaling from the gNB, e.g., in the prior 'D' slot(s), and depending on the provided signaling or lack thereof, the UE decides whether to attempt to for transmission in the upcoming CG resources. Above two behaviors may be executed in serially and the success of both allows the UE to attempt transmission in the said slot. Or the UE may be allowed to attempt transmission with execution of one of the above behaviors.

In still further example embodiments, such as previously discussed, the wireless station 132 (such as gNB) can be configured to reconfigure the active bandwidth part (BWP) of the wireless station CD21 to allow adjacent channel sensing, then reverts back to the original BWP after CCA by the wireless station CD21 has completed. For example, a UE operating on a 20 MHz carrier as its serving cell may need to perform reception on 60 MHz in order to sense two 20 MHz adjacent channels on either side, implying that the UE active BWP is effectively 60 MHz, while only one active BWP per UE is allowed in NR at a given time.

A PDCCH-based active BWP switch mechanism is already specified in NR as part of PDSCH or PUSCH scheduling DCI (e.g., DCI Format 1_1 or 0_1), but BWP indicator is not currently supported in the SFI indication of DCI Format 2_0. One solution is to indicate active BWP adaptation implicitly based on the explicit SFI indicator. In one embodiment, the duration of the new BWP config is the same as the CCA duration before switching back to the previous BWP size. Alternately, an explicit BWP indicator field may be added to DCI Format 2_0 conveying SFI.

Figure 14:
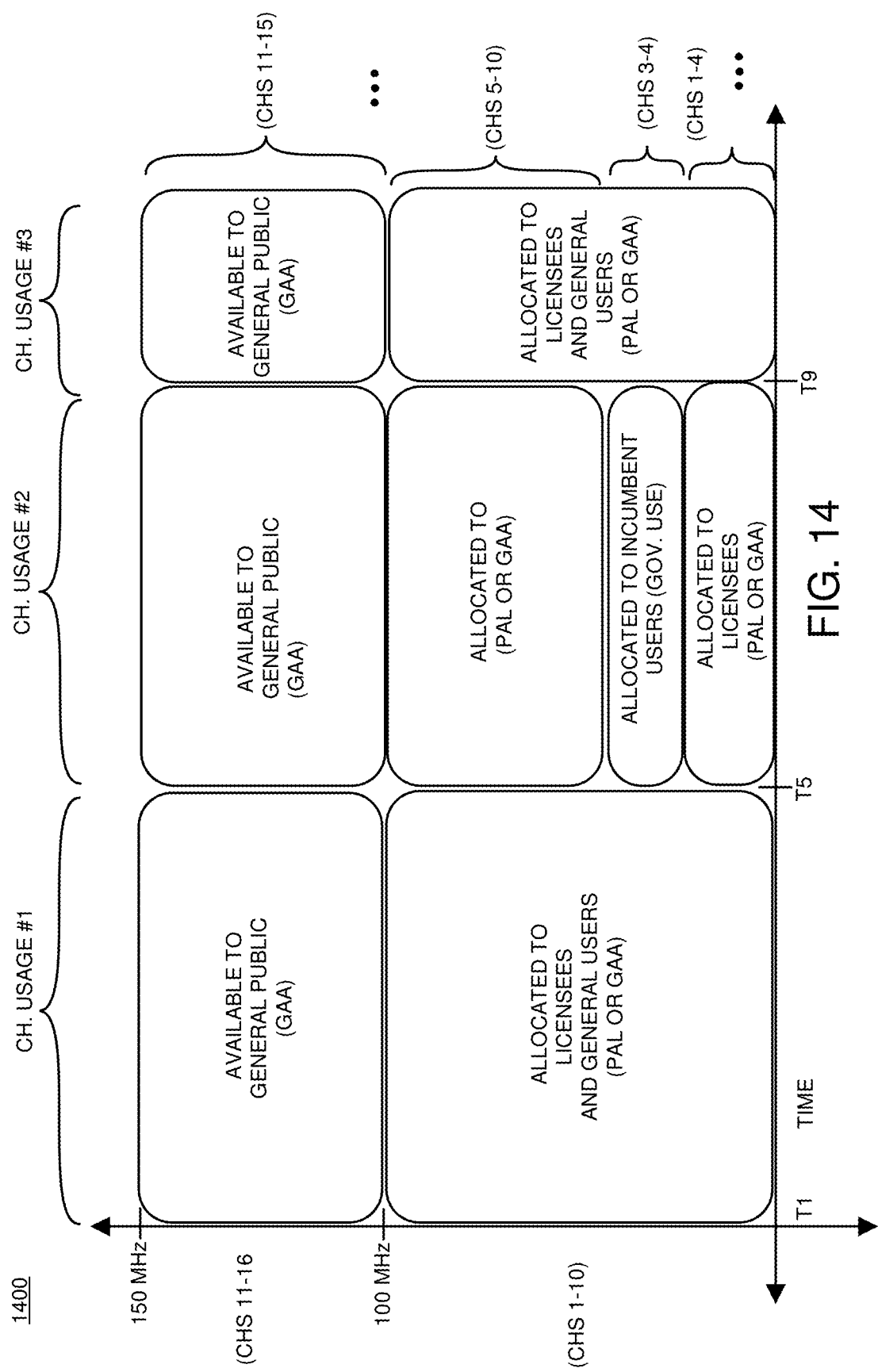
FIG. 14 is an example diagram illustrating generation of dynamic channel allocation information indicating allocation of spectrum at different tiers of a channel hierarchy such as associated with a shared CBRS (Citizen Band Radio Service) band according to embodiments herein.

FIG. 14 is an example diagram illustrating generation of dynamic channel allocation information indicating allocation of spectrum at different tiers of a channel hierarchy according to embodiments herein.

As previously discussed, bandwidth manager 130 can be configured to assign any suitable type of wireless spectrum (spectrum, wireless channels, etc.) for use by the wireless stations such as wireless base stations, communication devices, etc., in the network environment 100.

In one non-limiting example embodiment, the bandwidth manager 130 and allocation management resource 141 allocate spectrum (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the allocation management resource 141 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as use via a so-called incumbent user) is detected or requested via appropriate input (such as around time T5) to the allocation management resource 140, certain channels (such as those used by the general public) are no longer available for use.

More specifically, in this example, graph 1400 indicates that between time T1 and time T5 (such as mode #1 or first condition), there is no indication detection of an incumbent user and thus licensed wireless channels 1-10 are available for use by licensed wireless user (and potentially unlicensed GAA users) for use; channels 11-15 are available for use by unlicensed GAA users. In a manner as previously discussed, these channels are allocated for use by the wireless base stations in network environment 100.

As further shown, at or around time T5, assume that the spectrum monitor 140 detects use of the wireless channels #3 and #4 by an incumbent user having higher priority than the PAL users and GAA users. In such an instance, the bandwidth monitor 140 notifies the spectrum allocation management resource 141 of such use prompting discontinued use of wireless channels #3 and #4. At or around time T9, the incumbent entity no longer uses wireless channels #3 and #4. In such an instance, the wireless channel #3 and #4 are again allocated for use by wireless stations in the network environment.

Thus, at any time, any of the wireless channels can be revoked for use by respective one or more wireless stations.

Figure 15:
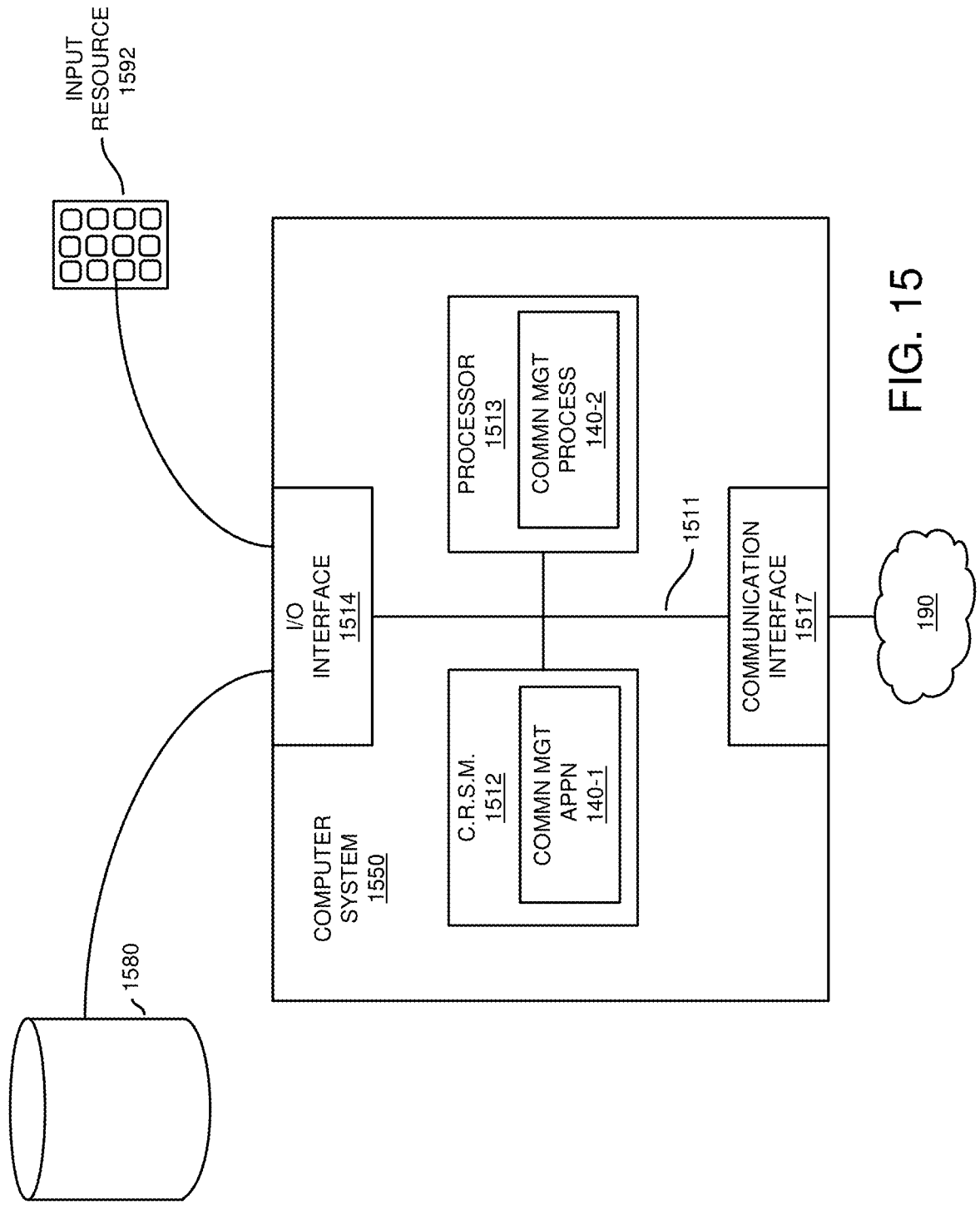
FIG. 15 is a diagram illustrating example computer architecture to execute one or more operations according to embodiments herein.

FIG. 15 is an example block diagram of a computer system for implementing any of the operations as previously discussed according to embodiments herein.

Any of the resources (such as communication management resource, allocation management resource 141, allocation management resource 142, bandwidth monitor 130, bandwidth manager 140, wireless station 131, wireless station 132, wireless station 133, wireless station CD21, wireless station CD22, etc.) as discussed herein can be configured to include computer processor hardware and/or corresponding executable instructions to carry out the different operations as discussed herein.

As shown, computer system 1550 of the present example includes an interconnect 1511 that couples computer readable storage media 1512 such as a non-transitory type of media (which can be any suitable type of hardware storage medium in which digital information can be stored and retrieved), a processor 1513 (computer processor hardware), I/O interface 1514, and a communications interface 1517.

I/O interface(s) 1514 supports connectivity to repository 1580 and input resource 1592.

Computer readable storage medium 1512 can be any hardware storage device such as memory, optical storage, hard drive, floppy disk, etc. In one embodiment, the computer readable storage medium 1512 stores instructions and/or data.

As shown, computer readable storage media 1512 can be encoded with communication management application 140-1 (e.g., including instructions) to carry out any of the operations as discussed herein.

During operation of one embodiment, processor 1513 accesses computer readable storage media 1512 via the use of interconnect 1511 in order to launch, run, execute, interpret or otherwise perform the instructions in management application 140-1 stored on computer readable storage medium 1512. Execution of the communication management application 140-1 (such as implemented by allocation management resource 141, each of the wireless stations, etc.) produces communication management process 140-2 to carry out any of the operations and/or processes as discussed herein.

Those skilled in the art will understand that the computer system 1550 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowcharts in FIG. 16. Note that the steps in the flowcharts below can be executed in any suitable order.

Figure 16:
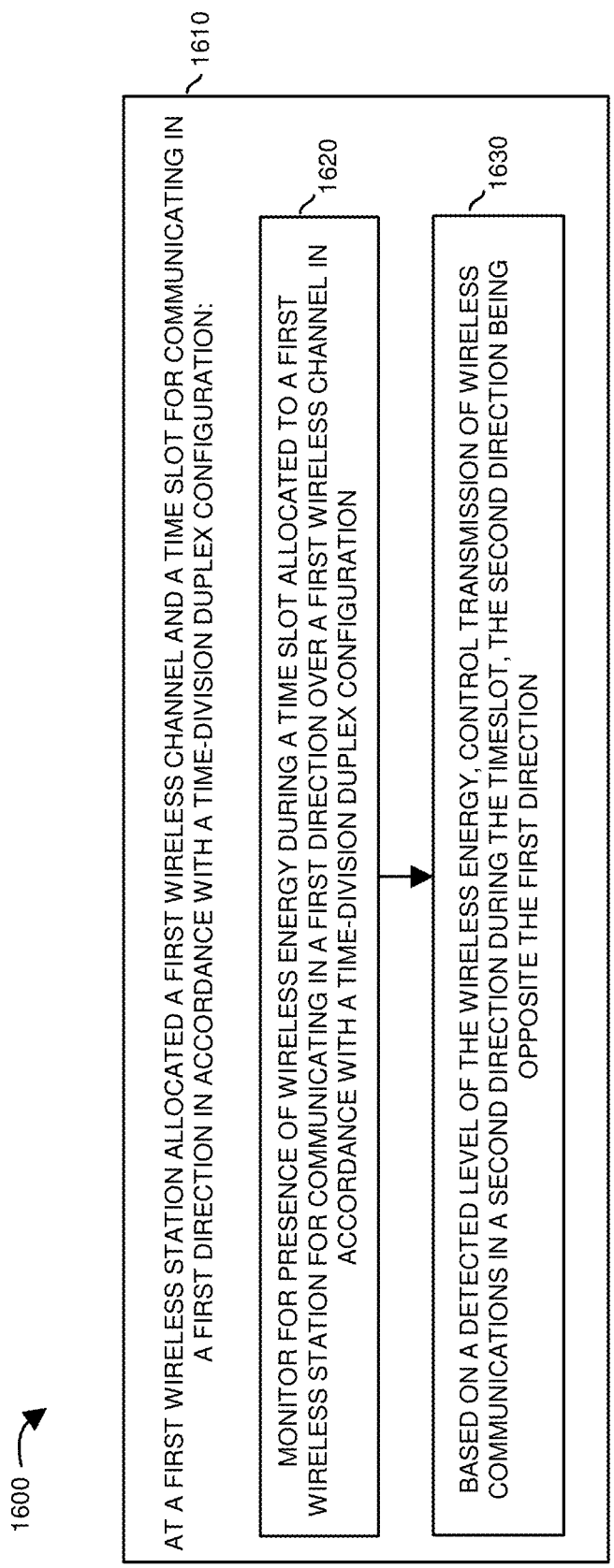
FIG. 16 is an example diagram illustrating a method according to embodiments herein.

FIG. 16 is a flowchart 1600 illustrating an example method according to embodiments. Note that there will be some overlap with respect to concepts as discussed above.

In this example embodiment, a first wireless station (wireless base station, user equipment, mobile communication device, etc.) is allocated a first wireless channel and a time slot for communicating in a first direction (such as uplink or downlink depending upon the case) in accordance with an assigned time-division duplex configuration.

In processing operation 1610, the first wireless station or other suitable entity monitors for presence of wireless energy during the allocated time slot.

In processing operation 1620, based on a detected level of the wireless energy, the first wireless station controls transmission of wireless communications in a second direction (such as downlink or uplink depending upon the case) during the timeslot, the second direction being opposite the first direction.

Figure 17:
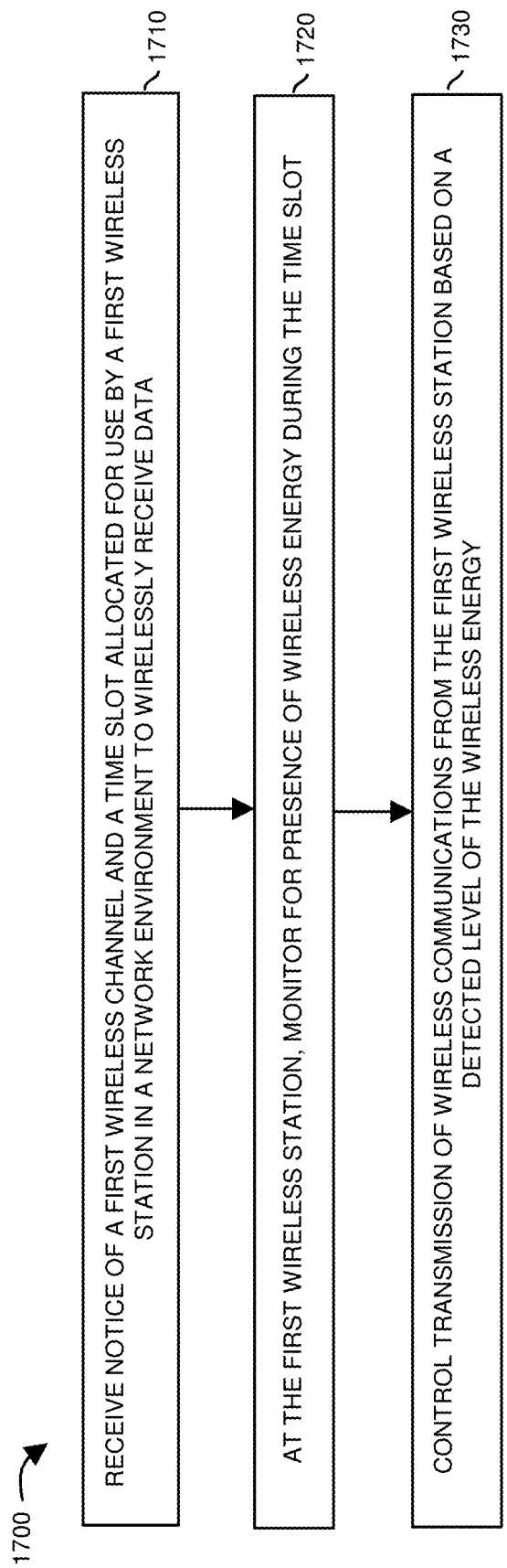
FIG. 17 is an example diagram illustrating a method according to embodiments herein.

FIG. 17 is a flowchart 1700 illustrating an example method according to embodiments. Note that there will be some overlap with respect to concepts as discussed above.

In processing operation 1710, the wireless station CD21 (such as a mobile communication device, user equipment, etc.) receives notice of a wireless channel #2 and a time slot allocated for use by the wireless station CD21 in the network environment 100. The allocated timeslot supports downlink of data to the wireless station CD21 in accordance with a time-division duplex configuration.

In processing operation 1720, the wireless station CD21 monitors for presence of wireless energy (such as in one or more adjacent wireless channels #1, #3, etc., or wireless channel #2 or both) during the assigned time slot.

In processing operation 1730, the wireless station CD21 controls transmission of wireless communications from the wireless station CD21 over the wireless channel #2 based on a detected level of the wireless energy in the one or more wireless channels.

Note again that techniques herein are well suited to support more efficient use of wireless channels in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at a first wireless station:
        receiving allocation of a time slot of a first wireless channel partitioned in accordance with a time-division duplex configuration, the time slot allocated to the first wireless station for transmitting downlink wireless communications in a downlink direction to a second wireless station; and
        receiving uplink wireless communications from the second wireless station in an uplink direction from the second wireless station during the time slot, the uplink direction being opposite the downlink direction.

2. The method as in claim 1 further comprising:
    receiving the uplink wireless communications from the second wireless station based on a detected level of wireless energy in the time slot.

3. The method as in claim 2, wherein receiving the uplink wireless communications includes:
    receiving the uplink wireless communications in response to the second wireless station detecting that the level of wireless energy in the time slot is below a threshold level.

4. The method as in claim 1 further comprising:
    during the time slot, wirelessly receiving data in the uplink wireless communications in the uplink direction from the second wireless station instead of the first wireless station transmitting the downlink wireless communications in the downlink direction to the second wireless station.

5. The method as in claim 2, wherein the level of wireless energy is detected in a second wireless channel adjacent to the first wireless channel.

6. The method as in claim 5, wherein the first wireless channel is one of multiple wireless channels allocated from first bandwidth to operate a first communication system; and
    wherein the second wireless channel is one of multiple wireless channels allocated from second bandwidth to operate a second communication system.

7. The method as in claim 2, wherein the level of wireless energy is detected at a beginning portion of the time slot.

8. The method as in claim 2, wherein the second wireless station is operative to control transmission of the uplink wireless communications over the uplink from the second wireless station to the first wireless station based on a comparison of the detected level of the wireless energy to a threshold level.

9. The method as in claim 1 further comprising:
    transmitting control information from the first wireless station to the second wireless station, the control information notifying the second wireless station to monitor for presence of wireless energy during the time slot.

10. The method as in claim 1, wherein the time slot of the first wireless channel is allocated for use by multiple wireless stations including the first wireless station to communicate in the downlink direction.

11. The method as in claim 1 further comprising:
    from the first wireless station, notifying the second wireless station to monitor a second wireless channel for presence of wireless energy during the time slot.

12. A system comprising:
    communication management hardware associated with a first wireless station, the communication management hardware operative to:
        receive allocation of a time slot of a first wireless channel partitioned in accordance with a time-division duplex configuration, the time slot allocated to the first wireless station for transmitting downlink wireless communications in a downlink direction to a second wireless station; and
        receive uplink wireless communications from the second wireless station in an uplink direction from the second wireless station during the time slot, the uplink direction being opposite the downlink direction.

13. The system as in claim 12, wherein the communication management hardware is further operative to:
    receive the uplink wireless communications from the second wireless station based on a detected level of wireless energy in the time slot.

14. The system as in claim 13, wherein the communication management hardware is further operative to:
    receive the uplink wireless communications in response to the second wireless station detecting that the level of wireless energy in the time slot is below a threshold level.

15. The system as in claim 12, wherein the communication management hardware is further operative to:
    during the time slot, wirelessly receive data in the uplink wireless communications in the uplink direction from the second wireless station instead of the first wireless station transmitting the downlink wireless communications in the downlink direction to the second wireless station.

16. The system as in claim 13, wherein the level of wireless energy is detected in a second wireless channel adjacent to the first wireless channel.

17. The system as in claim 16, wherein the first wireless channel is one of multiple wireless channels allocated from first bandwidth to operate a first communication system; and
    wherein the second wireless channel is one of multiple wireless channels allocated from second bandwidth to operate a second communication system.

18. The system as in claim 13, wherein the level of wireless energy is detected at a beginning portion of the time slot.

19. The system as in claim 13, wherein the second wireless station is operative to control transmission of the uplink wireless communications over the uplink from the second wireless station based on a comparison of the detected level of the wireless energy to a threshold level.

20. The system as in claim 12, wherein the communication management hardware is further operative to:
    transmit control information from the first wireless station to the second wireless station, the control information notifying the second wireless station to monitor for presence of wireless energy during the allocated time slot.

21. The system as in claim 12, wherein the time slot of the first wireless channel is allocated for use by multiple wireless stations to communicate in the downlink direction.

22. The system as in claim 12, wherein the communication management hardware is further operative to:
from the first wireless station, notify the second wireless station to monitor a second wireless channel for presence of wireless energy in the time slot.

23. Non-transitory computer-readable storage media having instructions stored thereon, the instructions, when carried out by computer processor hardware of a first wireless station, cause the computer processor hardware of the first wireless station to:
receive allocation of a time slot of a first wireless channel partitioned in accordance with a time-division duplex configuration, the time slot allocated to the first wireless station for transmitting downlink wireless communications in a downlink direction to a second wireless station; and
receive uplink wireless communications from the second wireless station in an uplink direction from the second wireless station during the time slot, the uplink direction being opposite the downlink direction.

* * * * *